United States Patent
Stephenson et al.

(10) Patent No.: US 9,809,480 B2
(45) Date of Patent: Nov. 7, 2017

(54) WASTEWATER TREATMENT PROCESS AND SYSTEM

(71) Applicant: Paradigm Environmental Technologies Inc., Vancouver (CA)

(72) Inventors: Robert John Stephenson, Vancouver (CA); Scott Christopher Laliberte, Vancouver (CA); Preston Yee Ming Hoy, Burnaby (CA); Patrick William George Neill, North Vancouver (CA)

(73) Assignee: Cypress Technologies Limited, West Vancouver (CA)

( * ) Notice: Subject to any disclaimer, the term of this patent is extended or adjusted under 35 U.S.C. 154(b) by 0 days.

(21) Appl. No.: 14/815,152

(22) Filed: Jul. 31, 2015

(65) Prior Publication Data

US 2015/0336831 A1    Nov. 26, 2015

Related U.S. Application Data

(63) Continuation of application No. 13/783,126, filed on Mar. 1, 2013, now Pat. No. 9,145,315.

(51) Int. Cl.
    *C02F 11/02*    (2006.01)
    *C02F 3/12*     (2006.01)
    (Continued)

(52) U.S. Cl.
    CPC ............ *C02F 11/02* (2013.01); *C02F 3/1221* (2013.01); *C02F 11/04* (2013.01); *C02F 11/12* (2013.01);
    (Continued)

(58) Field of Classification Search
    None
    See application file for complete search history.

(56) References Cited

U.S. PATENT DOCUMENTS

| 4,159,944 A | 7/1979 | Erickson |
| 4,170,550 A | 10/1979 | Kamody |

(Continued)

FOREIGN PATENT DOCUMENTS

| CA | 1071338 | 2/1980 |
| CA | 2664679 | 4/2008 |

(Continued)

OTHER PUBLICATIONS

Huyard, A., et al., "The two phase anaerobic digestion process: sludge stabilization and pathogen reduction", Water Science and Technology, 2000, 42(9):41-47.

(Continued)

*Primary Examiner* — Chester Barry
(74) *Attorney, Agent, or Firm* — Oyen Wiggs Green & Mutala LLP

(57) ABSTRACT

A process and system for treating wastewater is described. The invention degrades sludge produced by treatment of the wastewater to reduce or eliminate the need for sludge dewatering and disposal. The invention also reduces the amount of nutrient additives required to sustain the aerobic wastewater treatment process. In one embodiment the invention includes the steps of (a) providing an aerobic treatment system receiving a supply of the wastewater; (b) treating a supply of the sludge to rupture microbial cells present therein to produce treated sludge having an increased liquid:solid ratio and an increased degradation potential in comparison to untreated sludge; (c) conveying a supply of the treated sludge to the aerobic treatment system; and (d) substantially degrading the supply of treated sludge in the aerobic treatment system. The treated sludge may optionally be subjected to anaerobic digestion prior to delivery to the aerobic treatment system.

63 Claims, 15 Drawing Sheets

(51) Int. Cl.
*C02F 11/04* (2006.01)
*C02F 101/20* (2006.01)
*C02F 11/12* (2006.01)

(52) U.S. Cl.
CPC ...... *C02F 2101/20* (2013.01); *C02F 2203/00* (2013.01); *C02F 2203/004* (2013.01); *C02F 2303/06* (2013.01); *Y02W 10/15* (2015.05)

(56) References Cited

U.S. PATENT DOCUMENTS

| | | | |
|---|---|---|---|
| 4,915,840 A | 4/1990 | Rozich | |
| 5,472,875 A | 12/1995 | Monticello | |
| 5,725,772 A | 3/1998 | Shirodkar | |
| 5,846,425 A | 12/1998 | Whiteman | |
| 6,013,183 A | 1/2000 | Stephenson | |
| 6,033,571 A | 3/2000 | Hasegawa | |
| 6,059,971 A | 5/2000 | Vit | |
| 6,402,065 B1 | 6/2002 | Higgins | |
| 6,444,124 B1 | 9/2002 | Onyeche | |
| 6,491,820 B2 | 12/2002 | Held | |
| 7,001,520 B2 | 2/2006 | Held | |
| 7,264,182 B2 | 9/2007 | Richter | |
| 7,309,435 B2 | 12/2007 | Rozich | |
| 7,357,870 B2 | 4/2008 | Deleris | |
| 7,438,805 B2 | 10/2008 | Matsumoto | |
| 7,560,027 B2 | 7/2009 | Yamaguchi | |
| 7,651,614 B2 | 1/2010 | Kelsey | |
| 7,695,622 B2 | 4/2010 | Fabiyi | |
| 7,993,522 B2 | 8/2011 | Curtis | |
| 8,894,856 B2 | 11/2014 | Liu | |
| 2002/0185557 A1* | 12/2002 | Sparks | C12N 1/066 241/1 |
| 2006/0186039 A1 | 8/2006 | Richter | |
| 2008/0105614 A1 | 5/2008 | Fabiyi | |
| 2009/0026133 A1 | 1/2009 | Kelsey | |
| 2009/0078646 A1 | 3/2009 | Curtis | |
| 2009/0126514 A1* | 5/2009 | Burroughs | G01N 1/2208 73/863.22 |
| 2010/0264083 A1 | 10/2010 | Biesinger | |
| 2011/0203992 A1 | 8/2011 | Liu | |
| 2012/0152812 A1 | 6/2012 | Park et al. | |
| 2013/0140231 A1 | 6/2013 | Novak | |

FOREIGN PATENT DOCUMENTS

| | | | |
|---|---|---|---|
| CA | 2807867 | | 5/2013 |
| JP | 3558204 B2 | | 5/2004 |
| JP | 2006075779 A | | 3/2006 |
| WO | WO98/58740 | * | 12/1998 |
| WO | 2009/120384 A2 | | 10/2009 |

OTHER PUBLICATIONS

Whitlock, et al,. Underlying mechanistic principles and proposed modeling approach for waste activated sludge reduction technologies:, Residuals and Biosolids, 2009, pp. 899-913.

Wilson, et al., "Comprehensive enhanced digestion evaluations at blue plains advanced wastewater treatment plant", Residuals and Biosolids, 2009, pp. 887-898.

* cited by examiner

WASTEWATER TREATMENT PROCESS AND SYSTEM

REFERENCE TO RELATED APPLICATIONS

This application is a continuation of U.S. patent application Ser. No. 13/783,126 filed 1 Mar. 2013, now U.S. Pat. No. 9,145,315, the disclosure of which is hereby incorporated by reference in its entirety.

TECHNICAL FIELD

This application relates to a process and system for treating wastewater.

BACKGROUND

Many processes and systems for treating wastewater are known in the prior art. Conventional secondary treatment employs microorganisms to aerobically digest organic matter present in the wastewater. This results in a mass of microorganisms that settles as sludge in a clarifier connected to the wastewater aeration tanks. Typically a portion of the sludge, referred to as return activated sludge, is recirculated to the aeration tanks to sustain the aerobic treatment process. The excess sludge, referred to as waste activated sludge, is ordinarily dewatered and disposed of. The costs associated with waste activated sludge handling can be substantial, including the cost of chemical polymers, dewatering equipment and material transport.

Numerous systems are known in the prior art for conditioning sludge by biological, chemical and/or mechanical means. Such systems typically require dedicated reactors, large amounts of aeration and long residence times to achieve significant reductions in waste activated sludge volumes. Accordingly, many prior art systems are not suitable for continuous or semi-continuous sludge processing. Sludge handling is also often limited by the presence of non-biodegradable debris. Further, some prior art sludge conditioning renders the sludge unsuitable for downstream anaerobic treatment or complicates the dewatering process. The need has therefore arisen for an improved process and system for treating sludge that substantially or entirely avoids the need for dedicated reactors, extended residence times, sludge dewatering and nutrient supplementation of the aerobic treatment plant.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one embodiment of the invention a process for degrading sludge produced by treatment of wastewater is provided. The process comprises the steps of (a) providing an aerobic treatment system receiving a supply of the wastewater; (b) treating a supply of the sludge to rupture microbial cells present therein to produce treated sludge having an increased liquid:solid ratio and an increased degradation potential in comparison to untreated sludge; (c) conveying a supply of the treated sludge to the aerobic treatment system; and (d) substantially degrading the supply of treated sludge in the aerobic treatment system.

The invention also encompasses a system for treating wastewater derived from an effluent supply. The system includes (a) an aerobic treatment system for receiving wastewater from the effluent supply, wherein the aerobic treatment system produces treated effluent and aerobic sludge; (b) a sludge treatment unit receiving a supply of the sludge from the aerobic treatment system, wherein the sludge treatment unit ruptures microbial cells present in the supply of the sludge thereby producing treated sludge having an increased liquid:solid ratio and an increased degradation potential in comparison to untreated sludge; and (c) a sludge flowpath for conveying the treated sludge from the sludge treatment unit to the aerobic treatment system.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Conventional Wastewater Treatment System

Figure 1:
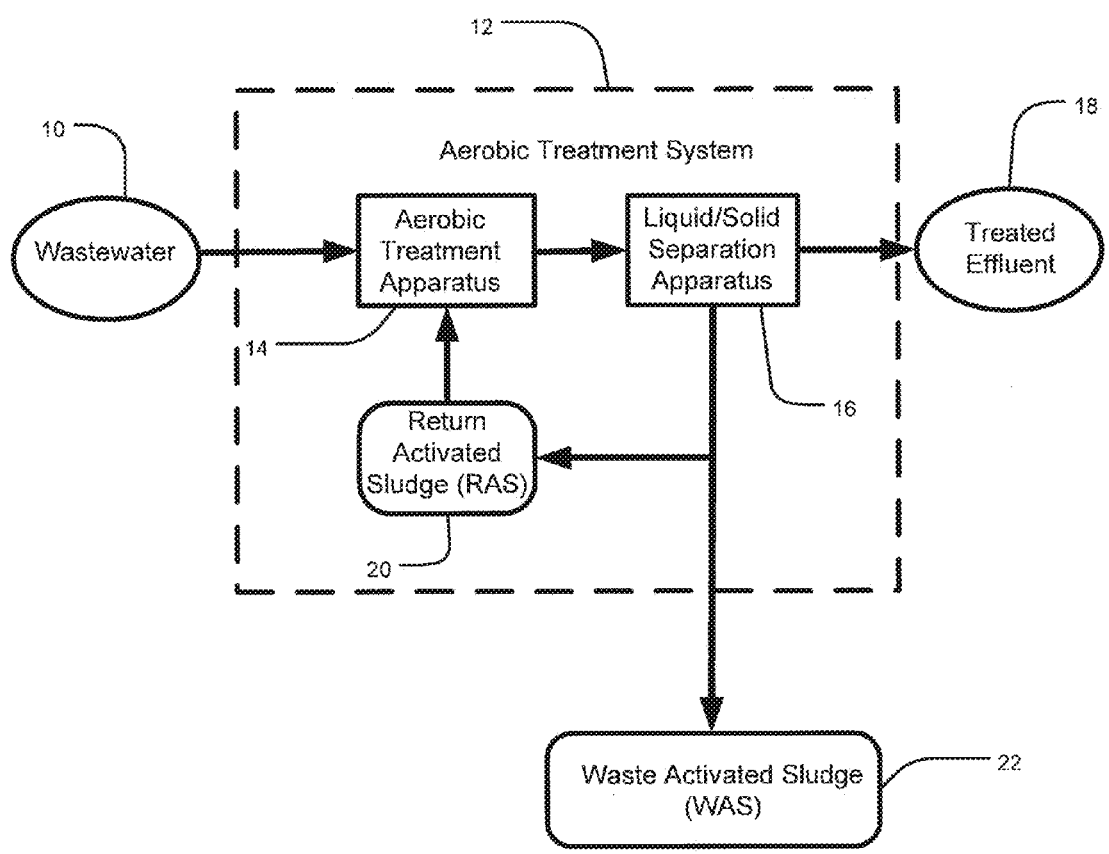
FIG. 1 is a schematic view illustrating a conventional wastewater treatment process and system employing aerobic treatment.

FIG. 1 illustrates the flow path of a conventional wastewater treatment system employing aerobic treatment. Wastewater or other effluent 10, such as wastewater from a pulp mill, is delivered to an aerobic treatment system 12. System 12 encompasses various means for removing organic material from wastewater 10 using oxygen or air in conjunction with aerobic microorganisms. This process typically produces three main products: (1) treated water; (2) carbon dioxide gas; and (3) excess microbes. System 12 may include for example an aerobic treatment apparatus 14 as well as a liquid/solid separation apparatus 16. Examples of an aerobic treatment apparatus 14 include an activated sludge reactor, oxygen-activated sludge wastewater treatment system (UNOX), trickling filter, aeration basin, oxidation ditch, rotating biological contactor, sequencing batch reactor, membrane bioreactor and suspended media systems. Examples of a liquid/solid separation apparatus 16 include a clarifier, membrane or filter.

Treated effluent 18 discharged from liquid/solid separation apparatus 16 is preferably suitable for direct release to the environment, for example into a waterway or a fluid conduit for recirculation to another part of the mill or other treatment site. Liquid/solid separation apparatus 16 may comprise a clarifier configured so that treated effluent 18 overflows weirs at the top of the clarifier. Typically the total suspended solids (TSS) and/or volatile suspended solids (VSS) concentrations in the treated effluent 18 must be below a threshold amount for environmental reasons.

The solids component which settles in separation apparatus 16 comprises sludge composed of microbes produced by the aerobic treatment process. As used in this patent application "aerobic sludge" refers to sludge produced by an aerobic treatment process. One type of commonly produced aerobic sludge is "activated sludge" which is derived from an aerobic treatment process using oxygen or air and a biological floc composed of bacteria and protozoa. Some of the activated sludge, typically termed "return activated sludge" (RAS) 20, is returned to the aerobic treatment apparatus 14 as part of the treatment system 12 to sustain the ongoing aerobic treatment process. The sludge fraction in excess of RAS 20 is typically termed "waste activated sludge" (WAS) 22. Conventionally WAS 22 is disposed of. However, the disposal process is expensive and typically requires several additional liquid/solid treatment steps. For example, WAS 22 may be dewatered using chemical polymers. Dewatering devices such as a centrifuge, belt press or filter press, may also be used, either alone or in combination. The dewatered sludge cake may then be shipped to a disposal site. The removed water may be returned to aerobic treatment system 12, conveyed to some other location at the treatment site, or otherwise discharged into the environment. The solids handling costs associated with such WAS 22 dewatering and disposal are usually a very significant component of the overall wastewater treatment operating costs, often second only to electrical costs.

Figure 2:
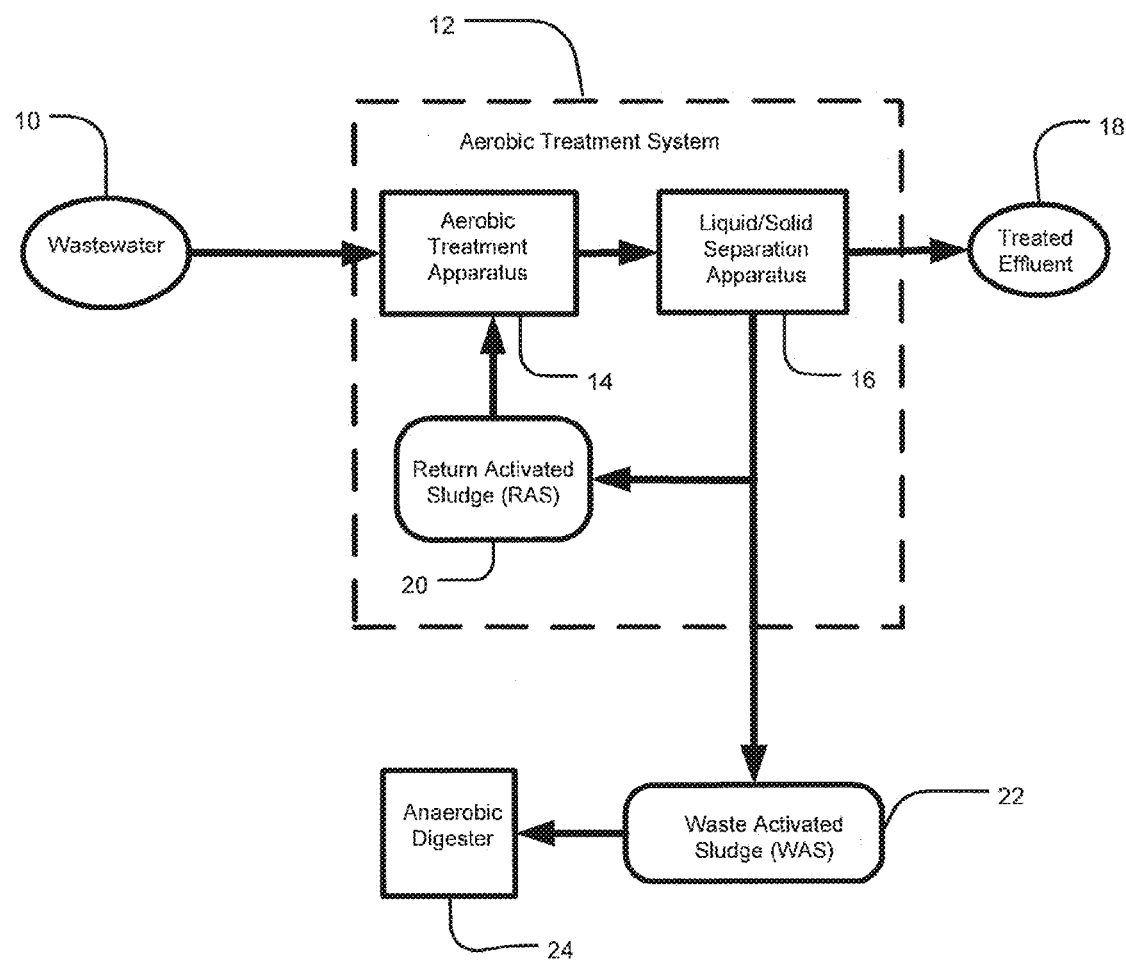
FIG. 2 is a schematic view of the process and system of FIG. 1 including anaerobic treatment of waste activated sludge in an anaerobic digester.

As shown in FIG. 2, some prior art systems include steps to subject WAS 22 to treatment in an anaerobic digester 24 prior to disposal in order to reduce VSS concentrations and produce biogas comprising methane and carbon dioxide. However, WAS 22 subjected to treatment in an anaerobic digester 24 is typically much more difficult and expensive to dewater than non-treated WAS 22.

Figure 3:
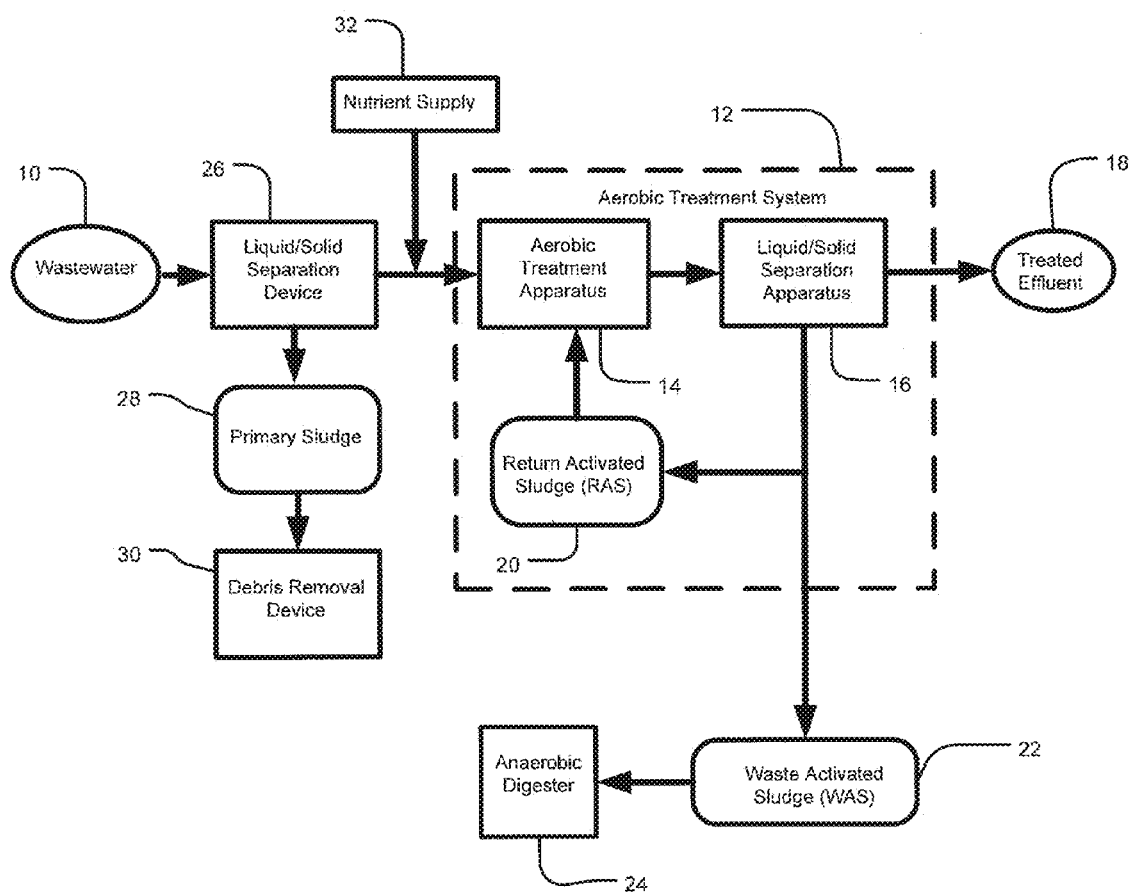
FIG. 3 is a schematic view of the process and system of FIG. 2 further including treatment of the wastewater upstream of the aerobic treatment system to produce primary sludge and to remove debris from the primary sludge.
Figure 4:
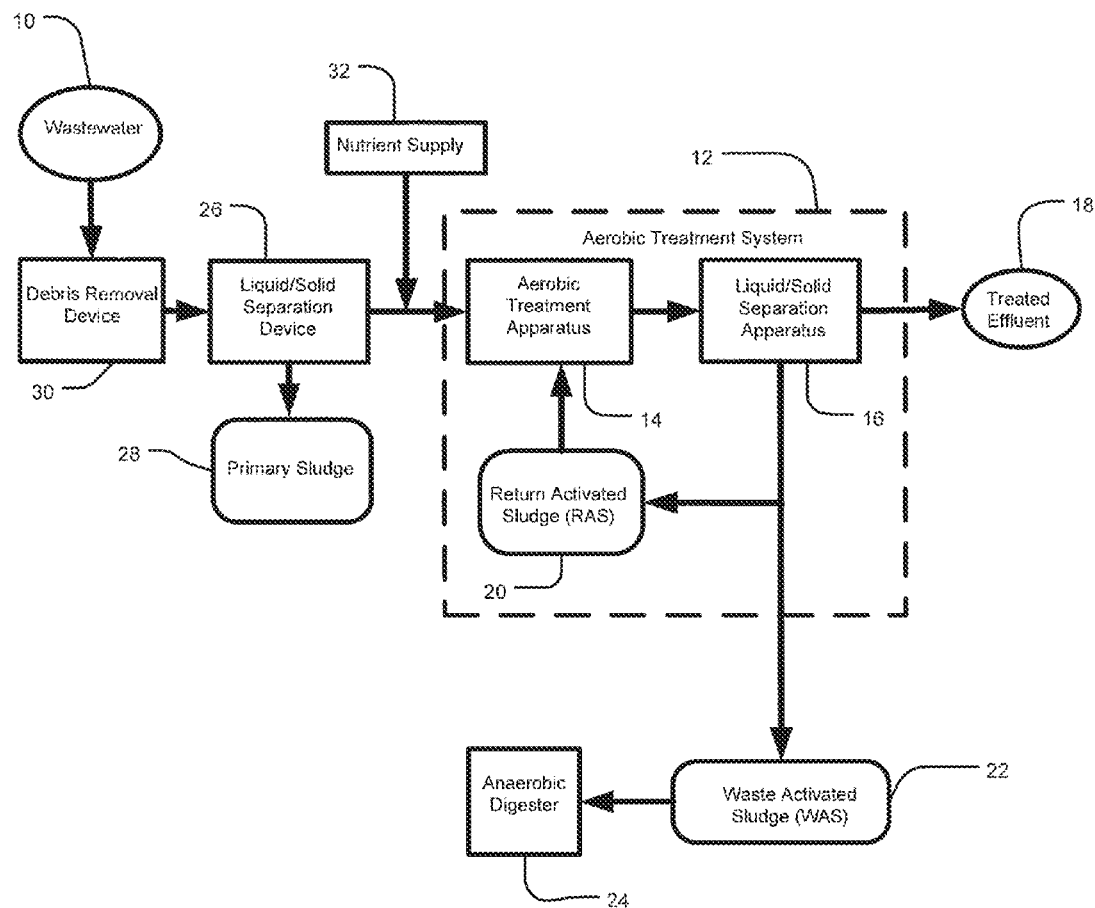
FIG. 4 is a schematic view of the process and system of FIG. 3 where debris removal from the wastewater occurs upstream from a liquid/solid separation apparatus.

As shown in FIGS. 3 and 4, a conventional wastewater treatment system may also optionally include means for treating the wastewater 10 before it is delivered to aerobic treatment system 12. For example, a liquid/solid separation apparatus 26 may be deployed upstream of treatment system 12. In one embodiment, liquid/solid separation apparatus 26 may be a primary clarifier and liquid/solid separation apparatus 16 within aerobic treatment system 12 may be a secondary clarifier. The liquid fraction discharged from separation apparatus 26 consisting of clarified wastewater 10 is delivered to aerobic treatment apparatus 14 and the solid fraction comprises primary sludge 28. Primary sludge 28 may be dewatered and disposed of in the same manner as WAS 22 described above.

Optionally, a debris removal device 30 may also be deployed upstream of aerobic treatment system 12, either alone or in combination with liquid/solid separation apparatus 26 (FIGS. 3 and 4). For example, debris removal device 30 may include a filter or some other separator, such as a hydrocyclone, for removing non-degradable particulate debris from the wastewater 10 and/or primary sludge 28. Depending on the waste stream, debris removal device 30 may be provided to remove relatively non-degradable particulate debris such as paper fibres, wood chips, hair, sand and grit, insects, snails, or pieces of plastic. Debris removal device 30 may either be located downstream (FIG. 3) or upstream (FIG. 4) of liquid/solid separation device 26 as will be apparent to a person skilled in the art.

Depending upon the nature of the wastewater 10 being treated, the treatment system may also include a nutrient supply 32 for adding nutrients to the influent to sustain the microbes in aerobic treatment apparatus 14. For example, a nutrient supply 32 may add nitrogen and/or phosphorus nutrients to wastewater 10 prior to delivery to aerobic treatment apparatus 14. In the case of pulp mill operations, wastewater 10 is usually high in carbon and low in nitrogen and phosphorus. Accordingly, nitrogen fertilizer in the form of urea may be added to wastewater 10 upstream from apparatus 14. Phosphorus fertilizer in the form of ammonium polyphosphate (APP) may also similarly be added. In the case of municipal waste, wastewater 10 may have a high nitrogen content and hence supplemental fertilizers may not be required.

Sludge Treatment and Handling

As illustrated in FIGS. 5-9, the present invention relates to a process for treating, recirculating and degrading sludge derived from treatment of wastewater. As explained below, a significant advantage of applicant's invention is that the cost and complexity of handling and disposal of sludge, such as WAS 22, is substantially reduced or eliminated. Also, treated sludge can be used as a nutrient source, thus avoiding or substantially reducing the need to add nitrogen and phosphate-based fertilizers to the wastewater treatment stream and providing increased opportunities for compound recovery. As will be appreciated by a person skilled in the art, while the present invention is primarily described with reference to activated sludge, it may also be applied to other types of aerobic sludge and/or primary sludge.

In the embodiment illustrated in FIG. 5A, RAS 20 is returned directly to aerobic treatment apparatus 14 in the conventional manner and WAS 22 is treated as described below and is then also recirculated to aerobic treatment apparatus 14. In the embodiment of FIG. 5B, all of the activated sludge 23 (comprising both fractions RAS 20 and WAS 22) is treated and recirculated to aerobic treatment apparatus 14. While the amount of sludge treated and recirculated may vary in different embodiments of the invention as described below and as exemplified in Example 1, a sufficient number of viable microbial cells is returned to aerobic treatment apparatus 14, either directly or after treatment, to sustain the ongoing aerobic treatment process.

Figure 5A:
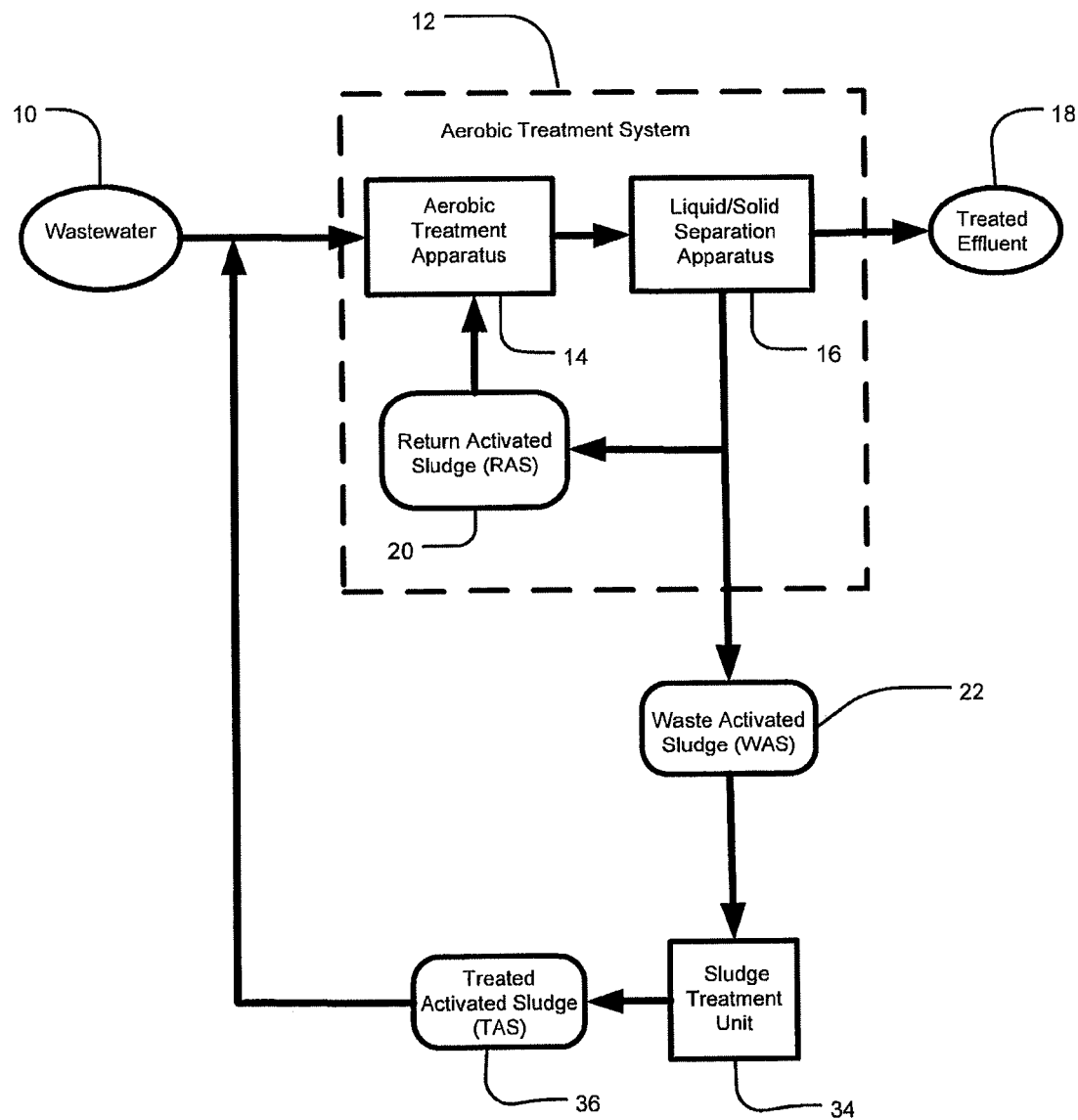
FIG. 5A is a schematic view illustrating a wastewater treatment process and system in accordance with the invention wherein a supply of waste activated sludge is treated and then recirculated to the aerobic treatment system.
Figure 5B:
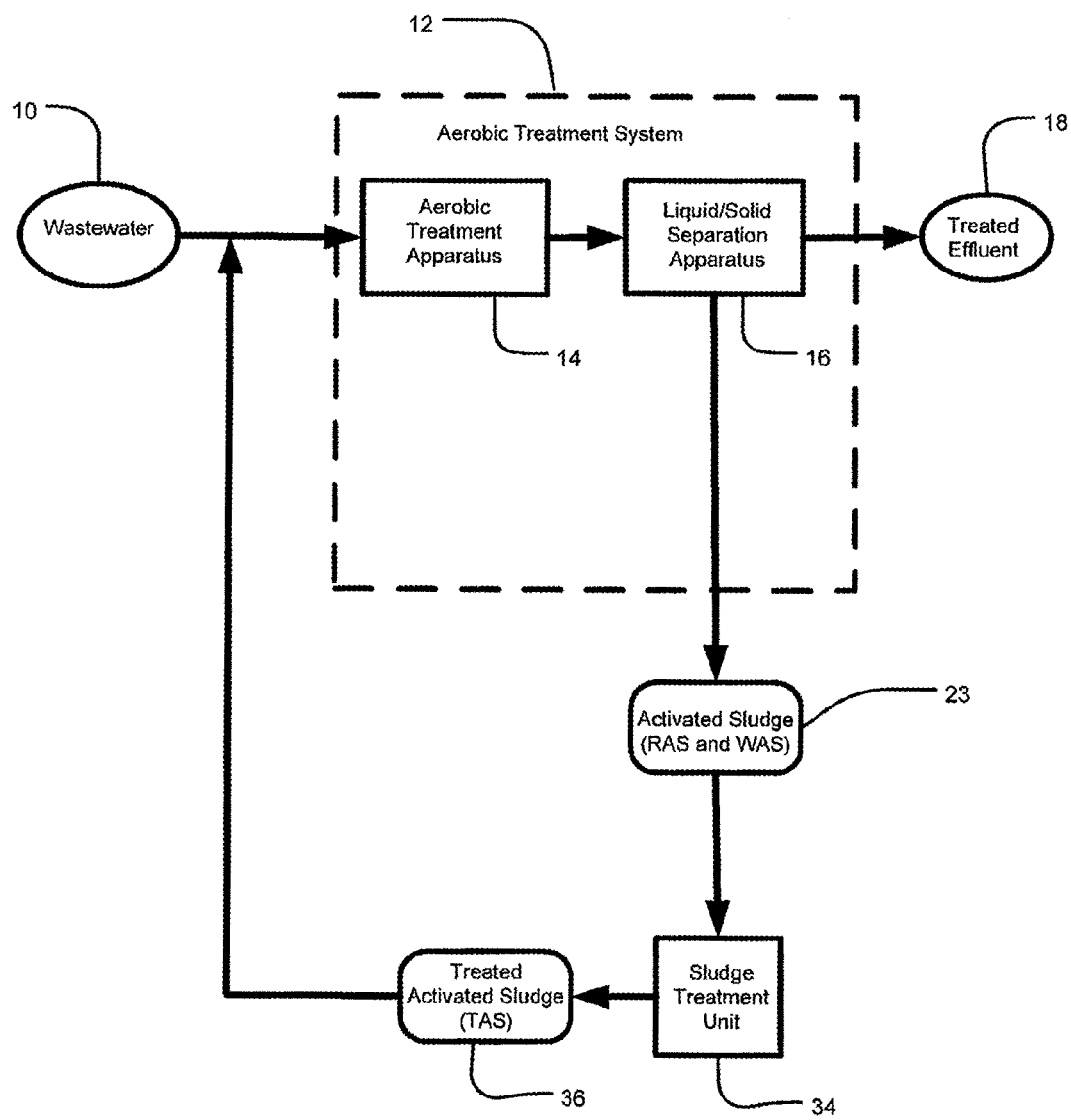
FIG. 5B is a schematic view illustrating a wastewater treatment process and system in accordance with the invention wherein a supply of activated sludge comprising both return activated sludge and waste activated sludge is treated and then recirculated to the aerobic treatment system.

In the embodiments of FIGS. 5A and 5B, the volume of activated sludge which requires dewatering and/or disposal can either be reduced or eliminated entirely. This is achieved by treating some or all of the activated sludge (and optionally primary sludge) to enhance its degradation potential and then recirculating the treated sludge to aerobic treatment apparatus 14 where it is substantially degraded. In some embodiments described herein the applicant's method can achieve an approximate equilibrium between the mass of activated sludge produced by aerobic treatment apparatus 14 and the mass of cellular-derived solids present in the treated sludge degraded in aerobic treatment apparatus 14 after recirculation. As explained herein, this equilibrium can be achieved without resulting in substantial solids accumulation in aerobic treatment system 12 or other deleterious effects.

Applicant's invention can operate in a continuous process thereby avoiding the need for batch processing of sludge, large dedicated reactors and long residence times. Alternatively the applicant's invention can operate semi-continuously, for example as in the case of a sequencing batch reactor (SBR). In an SBR the aerobic treatment system 12 may comprise a single vessel which functions as both an aerated bioreactor and a secondary clarifier in time sequenced processing stages. As will be understood by a person skilled in the art, in an SBR the reactor vessel is filled with influent wastewater and is aerated to enable aerobic digestion. The aeration is then stopped to allow for settling of suspended solids. The liquid portion is then decanted and the WAS is removed. The process is then repeated.

Sludge Treatment Unit

In the embodiment illustrated in FIG. 5A, WAS 22 is treated in a sludge treatment unit 34 in fluid communication with liquid/solid separation apparatus 16. The purpose of treatment unit 34 is to rupture microbial cells present in WAS 22 to release the cytoplasmic contents thereof. This treatment increases the liquid:solid ratio of the activated sludge (i.e. the liquid fraction increases relative to the solid fraction) and increases its degradation potential, as described further below. As illustrated in FIG. 5A, the treated activated sludge ("TAS") 36 is returned to aerobic treatment apparatus 14 rather than being disposed of. Thus in this embodiment aerobic treatment apparatus 14 of treatment system 12 receives TAS 36 as an input in addition to wastewater 10 and RAS 20 (FIG. 5A).

In different embodiments of the invention differing amounts of WAS 22 produced by aerobic treatment system 12 may be processed. In some embodiments a substantial fraction of WAS 22 discharged from liquid/solid separation apparatus 16 is conveyed to treatment unit 34. As used in this patent application the phrase "a substantial fraction" means at least 75% of the WAS 22 produced by aerobic treatment system 12. In particular embodiments the WAS fraction delivered to treatment unit 34 during operation of the invention may exceed 80%, or alternatively 90%, or alternatively 95% of WAS 22 produced by aerobic treatment system 12. In one embodiment described herein all of WAS 22 produced by aerobic treatment system 12 is delivered to treatment unit 34. Thus as used in this patent application the phrase "at least a substantial fraction" may include 100% of WAS 22 produced by aerobic treatment system 12. As will be appreciated by a person skilled in the art, WAS 22 may be conveyed from liquid/solid separation apparatus 16 to sludge treatment unit 34 continuously or semi-continuously (e.g. as in the case of a SBR) rather than in discrete batches.

Treatment unit 34 may comprise various different apparatuses and/or treatment steps for rupturing microbial cells present in the sludge to enhance the solubilization thereof. For example, the treatment may include one or more of elevated pressure, elevated temperature, addition of chemicals, addition of biochemicals, electroporation, microwave, cavitation, ultrasound or shear forces. Treatment unit 34 reduces the average particle size of solids present in the sludge and increases the overall liquid:solid phase ratio. This in turn reduces the amount of particulate solids requiring disposal and enhances the degradation potential of the sludge in downstream processing steps. As used in this patent application "degradation potential" refers to the capacity to convert sludge to degradation products such as (a) carbon dioxide as with aerobic treatment; or (b) biogas comprised primarily of methane and carbon dioxide as with anaerobic treatment. As used in this patent application an "increase in degradation potential" refers to an increase in the rate and/or extent that sludge can be degraded in such downstream treatment steps.

Depending upon the technology employed, treatment unit 34 may rupture cells present in activated sludge at different levels of cell lysis efficiency. In the case of high efficiency cell lysis technology, a substantial proportion of the microbial cells present in the sludge may be ruptured. As used in this patent application the phrase "a substantial proportion of microbial cells" means that at least 50% of the microbial cells present in the supply of sludge delivered to treatment unit 34 are ruptured. In alternative embodiments more than 60%, or alternatively more than 70%, or alternatively more than 80%, or alternatively more than 90%, or alternatively more than 95%, or alternatively more than 98%, or alternatively more than 99% of the microbial cells present in the sludge are ruptured in treatment unit 34 depending upon the cell lysis technology employed. Treatment unit 34 may also include means for treating sludge with caustic chemicals to weaken the microbial cell walls/membranes prior to high pressure treatment.

In one embodiment of the invention, treatment unit 34 may comprise a nozzle for subjecting sludge to high pressure treatment. A suitable high pressure treatment is described in U.S. Pat. No. 6,013,183 entitled Method of Liquefying Microorganisms Derived from Biological Wastewater Treatment Processes which is hereby incorporated by reference. The applicant's high pressure homogenizer described in the '183 patent is sold under the trademark MicroSludge®. The MicroSludge® cell disrupter/ homogenizer is highly effective in lyzing the cell walls or membranes of microorganisms present in the sludge and releasing the contents of the cell cytoplasms.

The soluble portion of solids in raw, untreated WAS 22 is usually not more than about 10% (i.e. the soluble amount of total solids (TS) or volatile solids (VS) as a fraction of total TS or VS). After treatment of WAS 22 in a MicroSludge® cell disrupter/homogenizer, the soluble portion of solids in WAS 22 may be increased to 20%-40% of the total amount, and to as high as 80% in some cases. That is, the MicroSludge® treatment causes substantial liquefaction of WAS 22, typically increasing the soluble portion of solids in WAS 22 by over 100%. Some other sludge treatments such as thermal hydrolysis are able to achieve similar increases in solubilization of solids while many other treatments result in much smaller relative increases in solids solubilization, typically on the order of 10-20%.

As will be apparent to a person skilled in the art, a MicroSludge® cell disrupter/homogenizer is an example of a treatment unit 34 having a very high cell lysis efficiency. That is, with reference to the embodiment of FIG. 5A, virtually all of the cells present in WAS 22 are lyzed. Alternative embodiments of the invention, for example employing ultrasound, electroporation or mechanical shear, would ordinarily achieve a much lower cell lysis efficiency.

Irrespective of the specific technology employed to treat the sludge prior to delivery to aerobic treatment apparatus 14, the goal of reducing or eliminating the volume of sludge requiring dewatering and/or disposal may be achieved. For example, in the case of a treatment technology achieving a relatively high level of cell lysis, such as a MicroSludge® cell disrupter/homogenizer, a relatively small amount of activated sludge may be directed to treatment unit 34, e.g. WAS 22 only (FIG. 5A). Since substantially all of the microbial cells present in the activated sludge delivered to treatment unit 34 are ruptured in this embodiment, a separate return line for RAS 20 would be remain necessary to sustain the aerobic treatment process in apparatus 14.

Alternatively, in the case of a treatment technology achieving a relatively low level of cell lysis, a relatively large amount of activated sludge may be directed to treatment unit 34, e.g. all of WAS 22 plus some or all of RAS 20 (FIG. 5B). Since the cell lysis efficiency in this embodiment is relatively low, as may occur in the case of ultrasound, electroporation, or mechanical sheer technologies, then TAS 36 (i.e. treated activated sludge) may contain a sufficient amount of viable cells to sustain the aerobic treatment process without returning any RAS 20 directly. That is, all or substantially all of the total volume of sludge which is separated in liquid/solid separation apparatus 16 (i.e. both fractions ordinarily designated as RAS 20 and WAS 22) could be delivered to treatment unit 34 for treatment and thereafter returned to aerobic treatment system 12 as TAS 36. So long as a sufficient proportion of the microbial cells present in TAS 36 remain viable, it would not be necessary in this embodiment to provide a separate RAS 20 return line.

In the case of a treatment unit 34 having a moderate cell lysis efficiency, wherein some of TAS 36 contains viable cells, the volume of RAS 20 returned to system 12 could be reduced but not supplanted entirely by the supply of TAS 36.

Many different embodiments of the invention may be commercially feasible. Typically sludge treatment technologies which have a low cell lysis efficiency also require a correspondingly low energy input. Accordingly, even though a larger total volume of activated sludge may be delivered to treatment unit 34 in the embodiment of FIG. 5B as compared to the embodiment of FIG. 5A, the overall operating cost of the sludge treatment process may not be increased or may be increased by a commercially acceptable amount.

Also, as in other embodiments of the invention, the need to dewater sludge would be avoided, resulting in significant cost savings.

Example 1 below further exemplifies treatment of WAS 22 using different cell treatment technologies.

Anaerobic Treatment

Figure 6A:
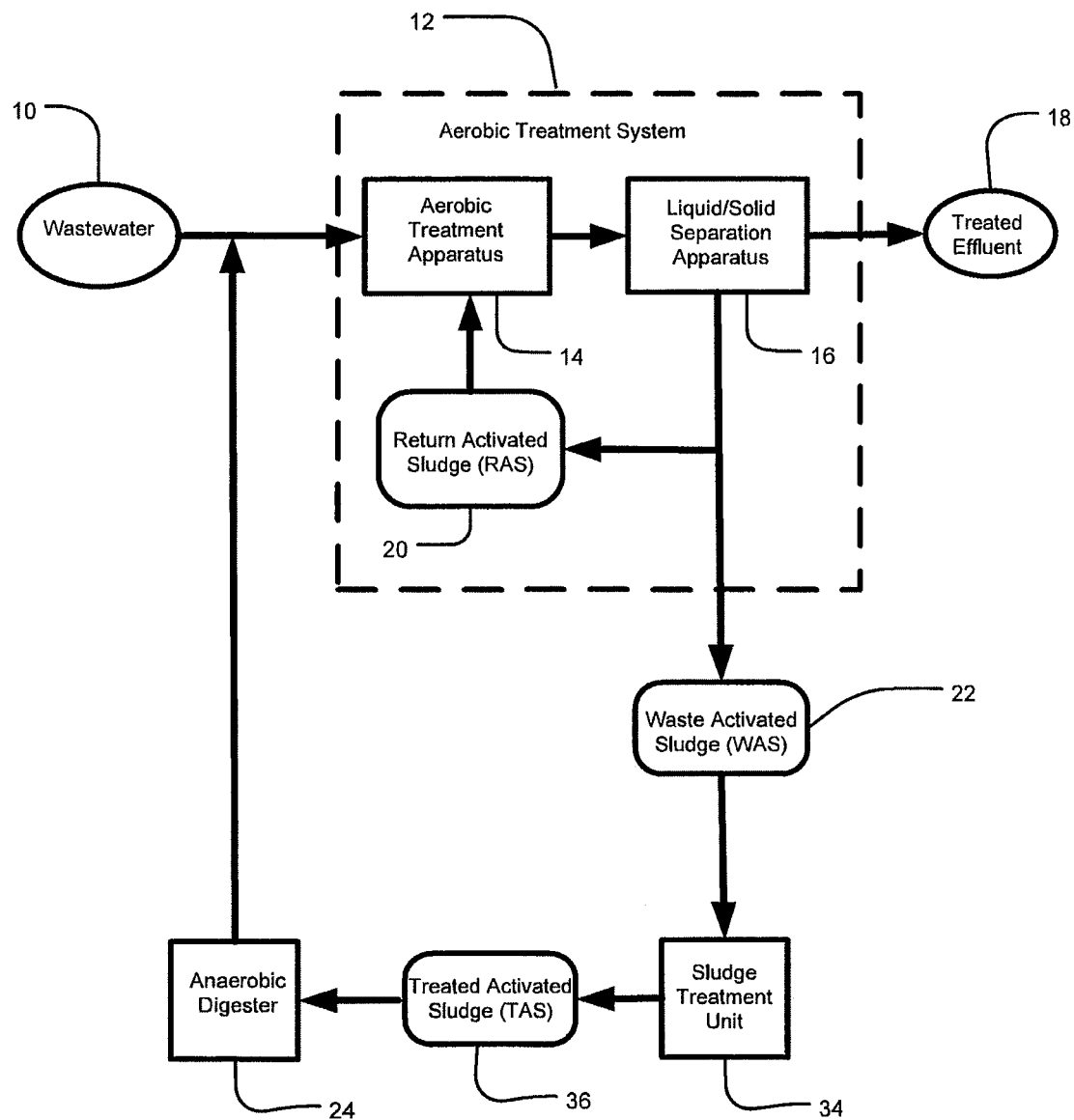
FIG. 6A is a schematic view of the process and system of FIG. 5A further including anaerobic digestion following waste activated sludge treatment.
Figure 6B:
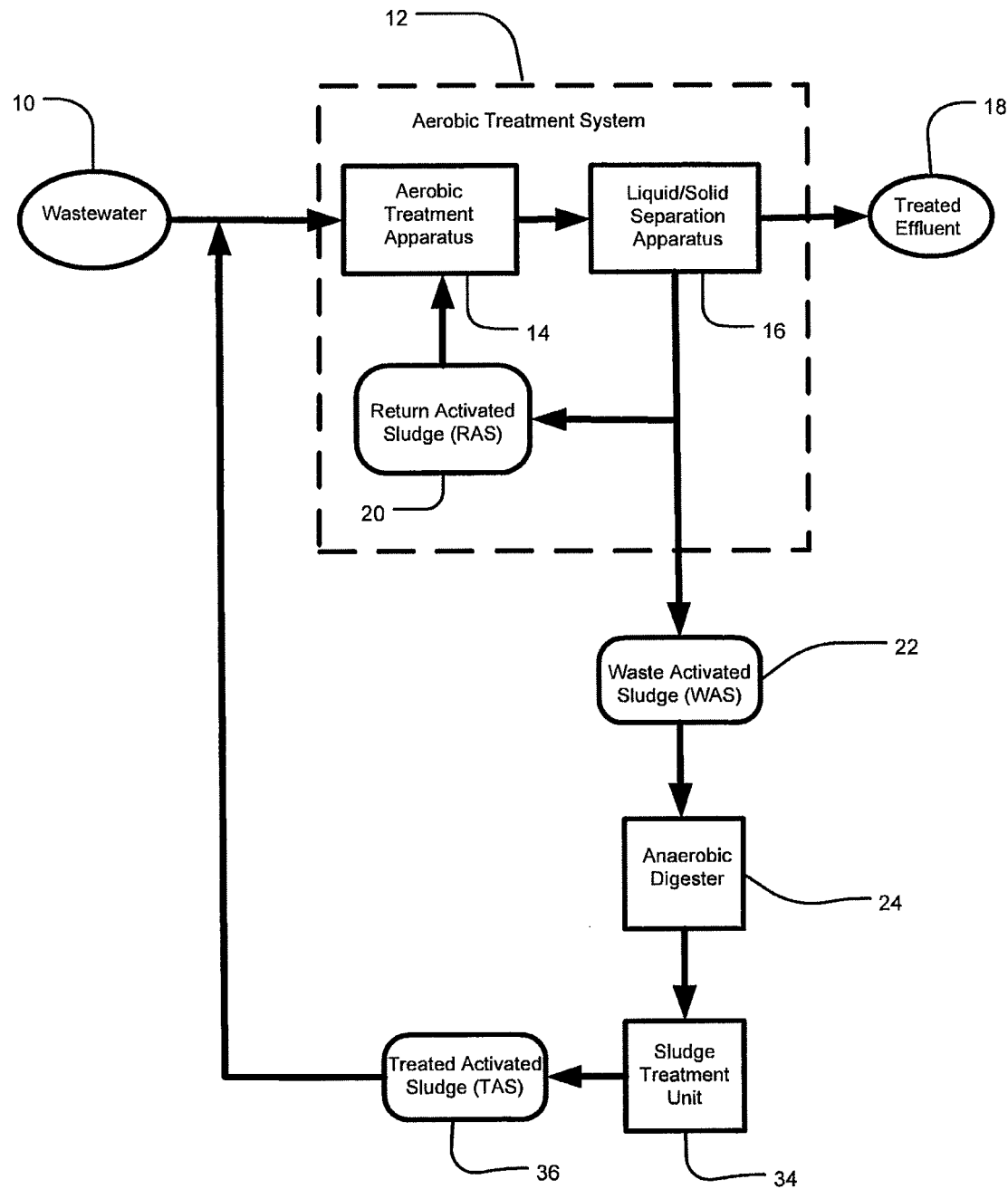
FIG. 6B is a schematic view of the process and system of FIG. 5A further including anaerobic digestion prior to waste activated sludge treatment.
Figure 6C:
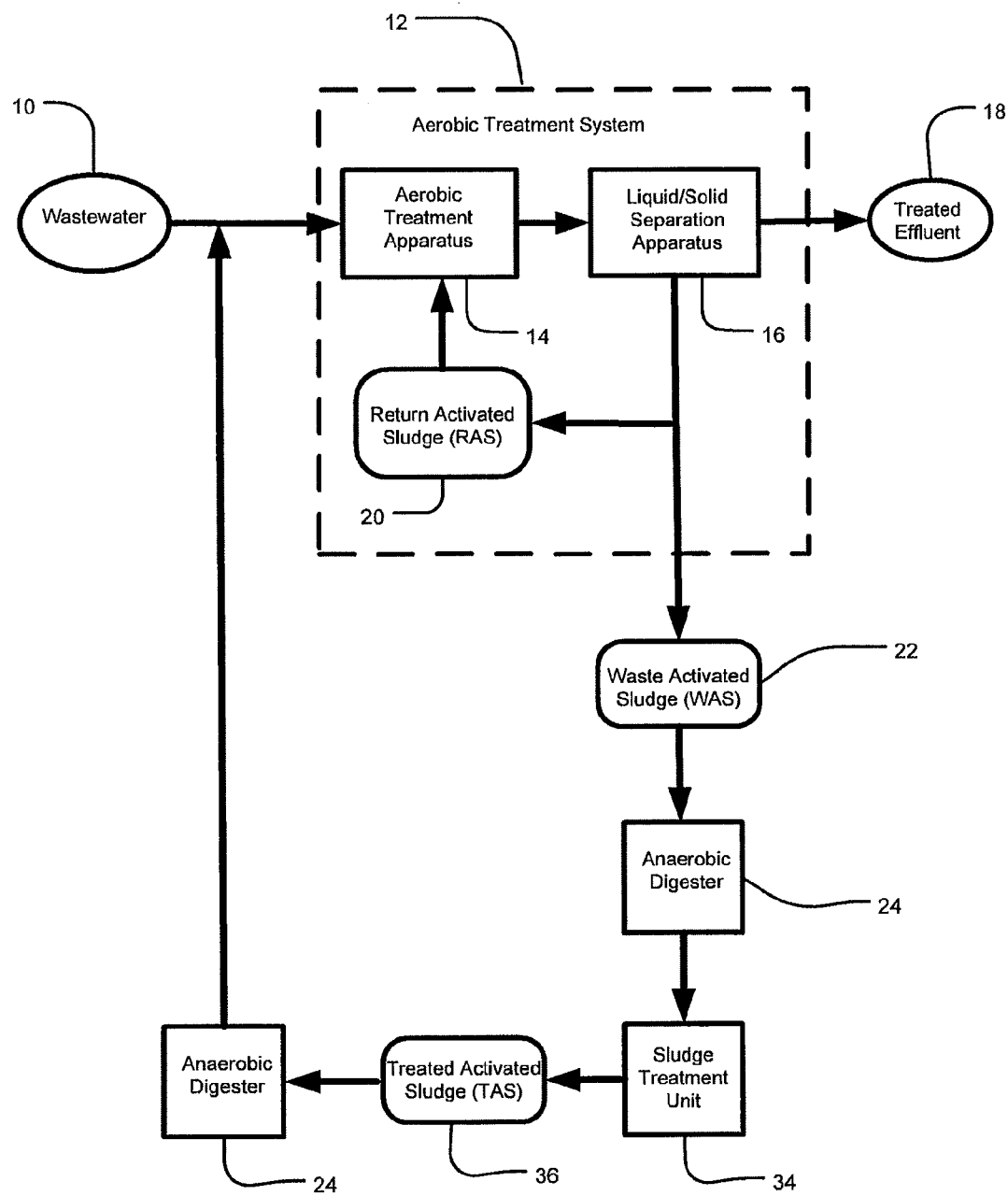
FIG. 6C is a schematic view of the process and system of FIG. 5A further including anaerobic digestion both prior to and following waste activated sludge treatment.

As shown in FIGS. 6A-6C, TAS 36 may be optionally subjected to anaerobic treatment in anaerobic digester 24 prior to delivery to aerobic treatment apparatus 14. In the embodiment of FIG. 6A, anaerobic digester 24 is located downstream of treatment unit 34 and upstream of aerobic treatment apparatus 14. In this embodiment the anaerobically digested TAS 36 is delivered directly to aerobic treatment apparatus 14 without dewatering, solids removal or any other treatment steps downstream of anaerobic digester 24. Optionally anaerobic digester(s) 24 may be located upstream from treatment unit 34 (FIG. 6B), or both upstream and downstream of treatment unit 34 (FIG. 6C).

Sludge Thickening

Figure 8:
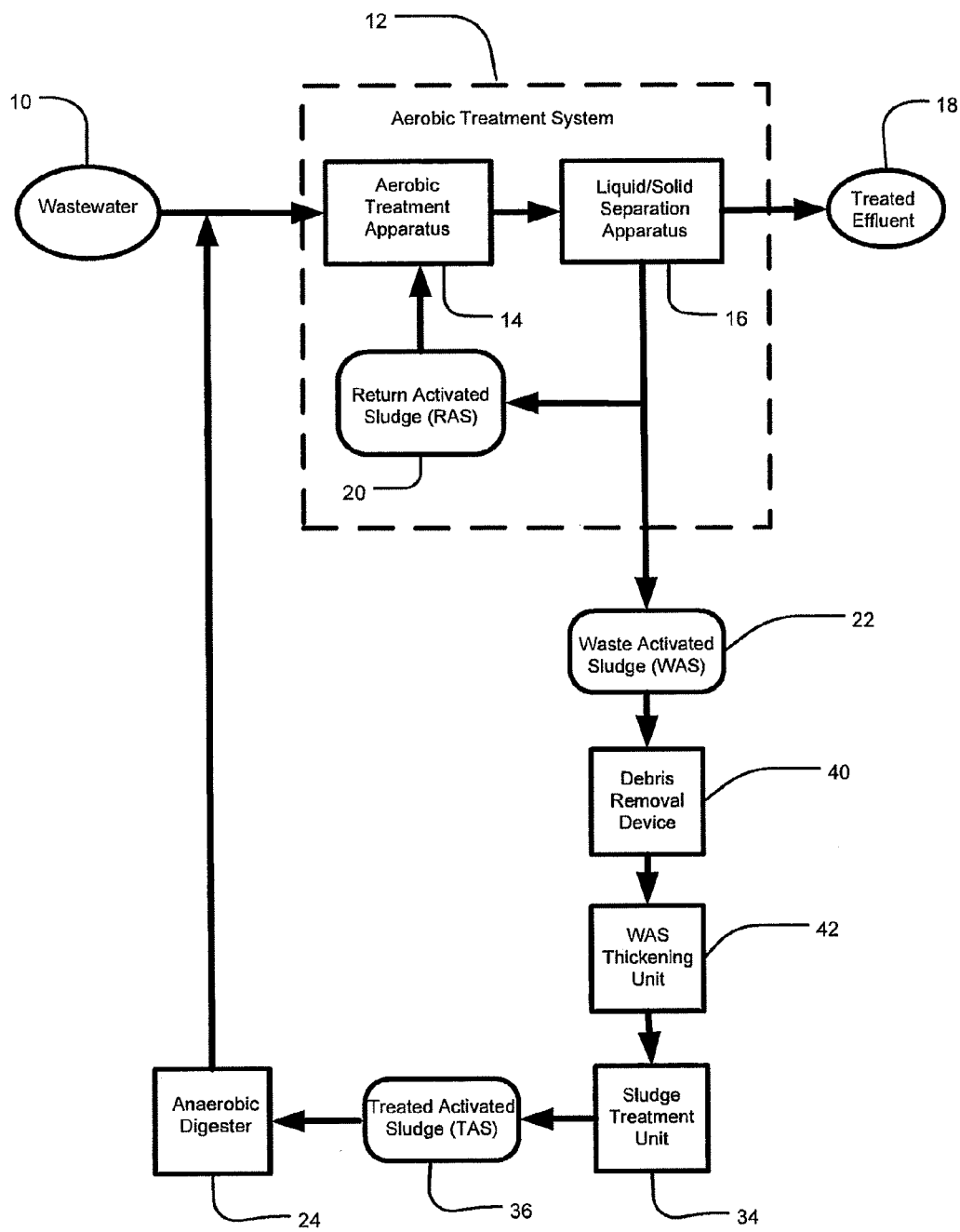
FIG. 8 is a schematic view of the process and system of FIG. 6A further including removal of debris from waste activated sludge and sludge thickening.

Prior to treatment in treatment unit 34, activated sludge such as WAS 22 may also optionally be subjected to sludge thickening. As shown in FIG. 8, a thickening unit 42 may be provided upstream of treatment unit 34. The purpose of such thickening is to concentrate the activated sludge prior to processing in treatment unit 34. Sludge thickening may be performed in apparatus 42 using gravity, a centrifuge, rotary drum thickener, gravity belt thickener, belt press, dissolved air flotation, or other means. Removed water is discharged to the environment or returned to the wastewater treatment plant. In one embodiment of the invention thickening unit 42 thickens WAS 22 from an approximate solids content of 1% to up to 10% solids content or more.

Debris Removal

Prior to WAS thickening, a debris removal device 40 may also optionally be provided upstream from treatment unit 34 (FIG. 8). Debris removal device 40 may include a filter or some other separator, such as a hydrocyclone, for removing any recalcitrant non-degradable particulate debris present in the activated sludge, such as WAS 22, which was not removed in upstream filtering steps. In one embodiment of the invention, debris removal device 40 may also optionally be configured to remove a portion of WAS 22 from the treatment stream, thereby reducing the volume of WAS 22 delivered to treatment unit 34. Any removed debris or excess WAS 22 is dewatered and/or disposed of in a manner similar to conventional systems described above.

The type and extent of debris removal employed will depend upon the make-up of the wastewater 10 being subjected to treatment. One or more debris removal devices may be located upstream of aerobic treatment system 12 (e.g. FIG. 4) or downstream of aerobic treatment system 12 (e.g. FIG. 8), or both. It is important that TAS 36 recirculated to aerobic treatment apparatus 14 be relatively free of debris to avoid gradual debris accumulation in system 12 over time.

Nutrient Recovery

Figure 7:
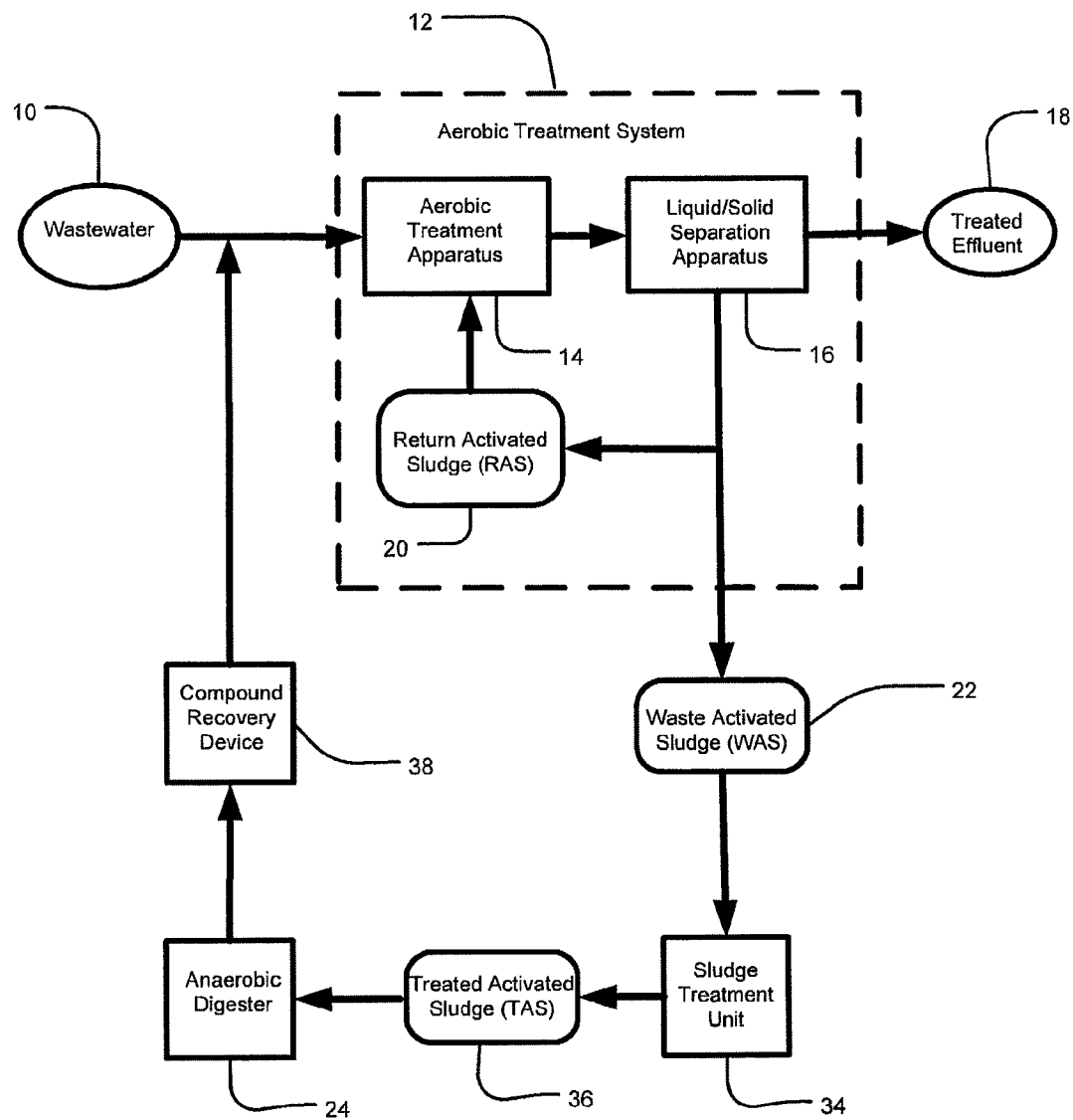
FIG. 7 is a schematic view of the process and system of FIG. 6A further including compound recovery following anaerobic treatment.

Depending upon the make-up of wastewater 10, it may be desirable to recover nutrients or other compounds from TAS 36 prior to its recirculation to aerobic treatment system 12. As shown in FIG. 7, a compound recovery device 38 may optionally be provided to recover nitrogen, phosphorus, heavy metals or other compounds from TAS 36. For example, in the case of municipal wastewater very high in nitrogen or phosphorus, it may be desirable to lower the nitrogen or phosphorus content of TAS 36 prior to recirculation. In the case of TAS 36 subjected to anaerobic digestion, compound recovery device 38 may be located either before or after anaerobic digester 24 in the treatment train. As will be apparent to a person skilled in the art, compound recovery device 38 may recover compounds by biological, chemical or other means. For example, recovery of compounds can be accomplished by means of chemical precipitation, growth of microorganisms or plants (e.g. biological nutrient removal (BNR) microbes or algae), liquid/solid separation, or other methods used separately or in combination. By way of specific example, a chemical process may be used to recover phosphorus and nitrogen as struvite (magnesium ammonium phosphate) from anaerobically digested TAS 36.

Treatment of Primary Sludge

Figure 9:
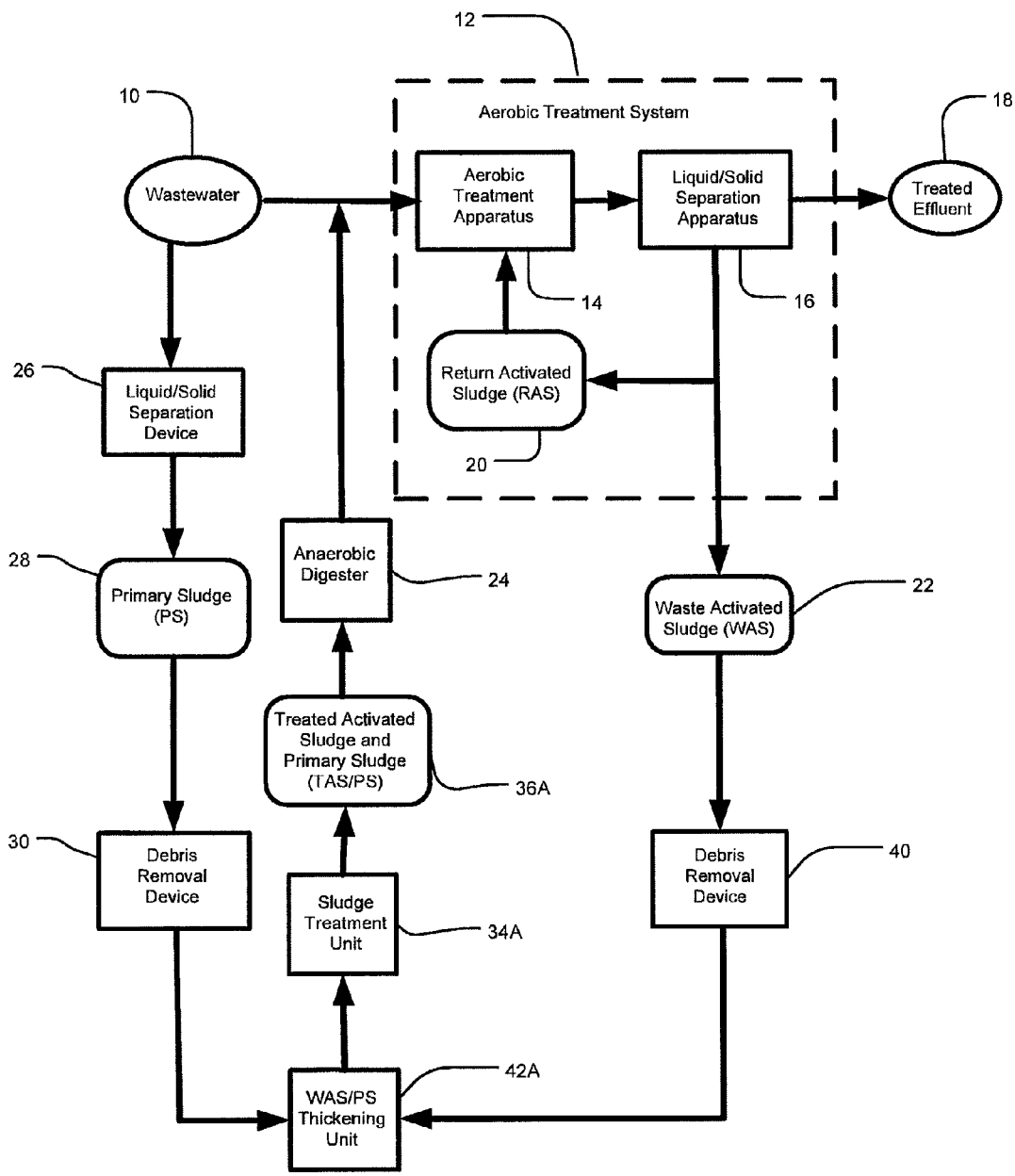
FIG. 9 is a schematic view of an integrated process and system for treating and recirculating both primary sludge and activated sludge in accordance with the invention.

As will be apparent to a person skilled in the art, the present invention may used in conjunction with various process steps and systems of the prior art. For example, as shown in FIG. 9 both activated sludge (e.g. WAS 22) and primary sludge 28 could optionally be subjected to combined thickening in a WAS/PS thickening unit 42A followed by treatment in a AS/PS treatment unit 34A. In this case, the treated activated and primary sludge (TAS/PS 36A) produced by this process would include a fraction derived from primary sludge 28. Alternatively, primary sludge 28 could be treated in a similar manner and recirculated to aerobic treatment system 12 as a separate material stream (i.e. comprising treated primary sludge only). The above wastewater treatment approach could also optionally include one or more of anaerobic digestion, compound recovery, sludge thickening, caustic treatment, debris removal or other processing steps as described above.

In particular embodiments, the present invention could be implemented in wastewater treatment steps including combined treatment and digestion of activated sludge 23 and primary sludge 28. That is, for example, the total amount of sludge treated in treatment unit 34 could include activated sludge 23 and/or primary sludge 28; the total amount of treated sludge subjected to anaerobic digestion could include sludge derived from activated sludge 23 and/or primary sludge 28; and the total amount of treated sludge degraded in aerobic treatment apparatus 14 could include sludge derived from activated sludge 23 and/or primary sludge 28. By removing non-biodegradable materials from primary sludge 28, for example using debris removal device 30 (FIG. 9), and treating primary sludge 28 to enhance its biodegradation, no significant accumulation of non-biodegradable materials occurs in the anaerobic digester 24, and no dewatering post anaerobic digestion is needed, enabling direct return of the anaerobic digester effluent to the aerobic treatment system 12. Further, the present invention encompasses compound recovery from treated or untreated primary sludge 28 in addition to activated sludge 23.

In some embodiments of the invention, a small amount of WAS 22 may be dewatered and disposed of together with primary sludge 28 and/or separated debris rather than degrading all of WAS 22 as described above. In particular, the applicant has determined that in some applications a small amount of WAS 22 may assist in dewatering of primary sludge 28 in terms of the total solids content of the dewatered sludge cake.

Sludge Treatment Summary

Generally speaking, prior art wastewater treatment systems relying solely on aerobic treatment cannot efficiently achieve the goal of substantially reducing or eliminating the volume of sludge for dewatering. Extended aeration of sludge (several weeks or more) is sometimes practiced, but this requires large vessels, large amounts of aeration and long residence times. Similarly, the combined steps of anaerobic and aerobic treatment, with no supplemental sludge treatment, generally cannot achieve the goal of substantially reducing or eliminating the volume of sludge requiring dewatering. That is, anaerobic digestion of sludge without upstream cell lysis treatment cannot achieve sufficient solids and particle size reduction to enable the aerobic treatment system to achieve an overall reduction of substantially all of the recirculated solids.

In applicant's invention sludge derived from wastewater treatment is subjected to a closed or substantially closed loop of treatment comprising, for example (1) rupturing of microbial cells in treatment unit 34 to yield TAS 36; (2) optional anaerobic digestion of TAS 36 in anaerobic digester 24; and return of TAS 36 to aerobic treatment system 12 without further dewatering or solids removal. As demonstrated in the experimental examples below, the applicant has surprisingly determined that substantially all TAS 36 recirculated in this manner is degraded in aerobic treatment system 12 without any reduction in system performance, accumulation of solids or other deleterious consequences. That is, the present invention, providing a processing loop of sludge treatment, optional anaerobic digestion, and aerobic treatment synergistically achieves significantly greater solids reduction than could be achieved from the individual processing steps performed independently. Further, difficult to degrade compounds may be made more biodegradable by cycles of sludge treatment/anaerobic digestion/aerobic treatment rather than just anaerobic digestion or aerobic treatment alone. The net effect of this processing loop is significantly less sludge for dewatering, and correspondingly lower costs for sludge handling and disposal. Significant additional cost savings are also achieved by a reduction in the amount of fertilizer nutrients which need to be added to the system to sustain ongoing aerobic treatment of some nutrient deficient wastewaters. Optionally, similar advantages may be achieved by separate or combined processing of some or all of the primary sludge derived from the wastewater stream in addition to the activated sludge or other aerobic sludge.

It is desirable in the various different embodiments of the invention to avoid solids accumulation in aerobic treatment system 12 and/or excess TSS in treated effluent 18 as the wastewater treatment process operates continuously or semi-continuously over time (including many successive cycles of treated sludge recirculation). This is achieved by degrading all or a sufficiently large proportion of the recirculated TAS 36 in aerobic treatment apparatus 14, or aerobic treatment apparatus 14 in combination with other process steps such as optional anaerobic treatment in anaerobic digester 24. As exemplified in the experimental examples below, this can be confirmed by determining that there is no significant change in the specific oxygen uptake rate (SOUR) of the microbial community in aerobic treatment apparatus 14 and by maintenance of a relatively constant total sludge mass inventory in aerobic treatment system 12. Further, the TSS concentration in treated effluent 18 can be monitored to ensure it is maintained below a desired threshold value.

As specifically demonstrated in Examples 2-4 below, although the total biological oxygen demand (BOD) and chemical oxygen demand (COD) load delivered to aerobic treatment apparatus 14 increases in applicant's invention due to the addition of TAS 36 to the influent infeed delivered to system 12, the concentration of VSS discharged in treated effluent 18 and the sludge volume index (SVI) of liquid/solid separation apparatus (secondary clarifier) 16 does not materially increase. Thus substantially complete aerobic destruction of TAS 36 is unexpectedly achieved in applicant's invention.

Further, although applicant's invention conveys treated activated sludge TAS 36 to aerobic treatment apparatus 14 for processing in addition to influent wastewater 10, it does not require an extended hydraulic residence time (HRT) in aerobic treatment apparatus 14 to accommodate the increased solids load. For example, if an oxygen activated (UNOX) apparatus is employed as an aerobic treatment apparatus 14 for treatment of domestic wastewater 10, then the hydraulic residence time (HRT) is typically within the range of about 1 to 4 hours. If a conventional high rate aeration system is employed as an aerobic treatment apparatus 14 for treatment of domestic wastewater 10, then the HRT is typically in the range of about 4 to 8 hours. If an extended aeration system is employed as an aerobic treatment apparatus 14 for treatment of domestic wastewater, then the HRT may range from about 18 to 36 hours. Since TAS 36 has an increased degradation potential in comparison to untreated sludge as explained above, it can be introduced into apparatus 14 without the need to alter the influent flow rate of wastewater 10 and the HRT for the system in question.

By contrast, conventional systems for aerobic treatment of raw (untreated) sludge typically require dedicated reactors, large amounts of aeration and much longer residence times in order to be effective. For example, conventional systems relying on endogenous respiration of raw sludge typically employ an HRT in the range of about 10 to 12 days at 20° C. in order to achieve a volatile solids reductions (VSr) of about 40 to 45%. Even longer residence/detention times on the order of 35 to 50 days are typically required in order to achieve a volatile solids reduction sufficient to meet the vector attraction reduction requirements of US regulations, depending on digestion temperature and biodegradability of the sludge.

In applicant's invention, rather than relying on endogenous respiration, the cell lysis treatment in sludge treatment unit 34 increases the degradation potential of the sludge as described herein so that TAS 36 and/or TAS/PS 36A is a more effective substrate for downstream anaerobic and/or aerobic treatment. Thus anaerobic treatment of TAS 36 (e.g. FIG. 7) or TAS/PS 36A (e.g. FIG. 9) may proceed several times faster than anaerobic digestion of raw sludge and aerobic treatment of TAS 36 and/or TAS/PS 36A can proceed within the usual HRT of the wastewater treatment system in question (i.e. without any adjustment of the residence time to accommodate the larger solids load). Thus, irrespective of the cell lysis technology employed in sludge treatment unit 34, the applicant's invention is operational in a continuous or semi-continuous manner with relatively short residence times.

Optimizing Clarifer Operation

Applicant's invention may improve rather than compromise the operation of liquid/solid separation apparatus 16, such as a secondary clarifier. One indicator of clarifier performance is the sludge volume index (SVI). The SVI is a measure of the volume in milliliters occupied by 1 g of a suspension after 30 minutes of settling. SVI is thus an indicator of the effectiveness of a clarifier in separating solids from liquids by settling. A higher SVI indicates less effective settling and hence less effective clarifier operation.

Many factors may affect clarifier operation. The applicant has determined that adjusting the volume and/or rate that TAS 36 is recirculated to aerobic treatment system 12 in accordance with the invention is effective in optimizing clarifier operation for several reasons. The amount of WAS 22 withdrawn from the liquid/solid separation apparatus (clarifier) 16 that is available for return as TAS 36 can be varied for example by adjusting the operation of a pump to remove sludge from the sludge blanket in the clarifier.

One factor contributing to less effective settling of solids in a clarifier, and hence a higher SVI, is the presence of filamentous microbes such as *Microthrix parvicella* in the sludge generated by aerobic treatment apparatus 14. Filamentous microbes are typically produced in nutrient-deficient conditions. Thus the ratio of the food supply (F) to microbe population (M) is important. Increasing the F:M ratio favours the formation of flocs which settle more readily than filamentous microbes. Increasing the F:M ratio can be achieved in applicant's invention by wasting more WAS 22 to WAS treatment unit 34. This in turn results in a larger volume of TAS 36 which can be recirculated to aerobic treatment apparatus 14 as described above. This adjustment decreases the overall microbe population in aerobic treatment system 12 while increasing the food supply in the form of TAS 36 (i.e. biologically available N, P, C and other nutrients). The net effect is a reduction in the "starvation" conditions which favour production of filamentous microbes and better solid settling characteristics in liquid/solid separation apparatus (clarifier) 16.

The above-described adjustment also lowers the depth of the sludge blanket in liquid/solid separation apparatus (clarifier) 16. This will increase the distance between the top of the sludge blanket and the clarifier overflow weirs, lowering the likelihood that solids at the top of the sludge blanket will become re-suspended and exit the clarifier overflow. A smaller sludge blanket will also decrease the solids residence time in separation apparatus 16, minimizing the extent to which anoxic conditions in the sludge blanket enable the creation of gas bubbles that disrupt the settling of solids.

Increasing the volume of WAS 22 processed and returned to system 12 as TAS 36 may also act to lower the sludge age in some embodiments of the invention. This may also be beneficial since younger sludge tends to settle at a faster rate than older sludge.

In the case of entrenched filamentous microbes, increasing the volume or flow rate of WAS 22 discharged from separation apparatus 16 results in increased destruction of microbes in sludge treatment unit 34 by cell lysis. This results in a direct reduction in the filamentous microbe population.

As described above, TAS 36 comprises solubilized microbes and small particle size fragments of cell walls and membranes. These fragments may provide an effective substrate for microbial attachment and flocculation, thereby increasing the solids settling rate in liquid/solid separation apparatus (clarifier) 16.

Increasing the volume of TAS 36 recirculated can thus function to lower the SVI and increase the concentration of microbes in the sludge blanket. For a constant mass of RAS 20, the RAS flow rate can be decreased in proportion to the decrease in SVI. This can in turn lower hydraulic loads contributed by RAS 20 and permit more efficient operation of system 12.

As will be apparent to a person skilled in the art, increasing the rate of WAS 22 conversion to TAS 36 and recirculation to aerobic treatment apparatus 14 may increase energy costs associated with operation of sludge treatment unit 34, anaerobic digester 24 and/or system pumps. Further, the aeration supply to aerobic treatment apparatus 14 may also need to be increased to accommodate the increased TAS 36 volume. However, in most cases such increased operational costs will be more than offset by avoiding the need for dewatering and disposal of WAS 22 as well as nutrient supplementation. By adjusting the discharge rate of WAS 22 from liquid/solid separation apparatus (clarifier) 16, the system parameters can be optimized for a particular wastewater treatment application to limit energy costs while maintaining efficient clarifier operation and hence desirable treated effluent characteristics. For example, the WAS discharge pumps may be adjusted manually or automatically to maintain TSS concentrations in the treated effluent 18 below a threshold amount while recirculating all or substantially all of WAS 22 as TAS 36.

As explained above, the need for nutrient supplementation and the opportunity for nutrient recovery can vary depending upon the make-up of wastewater 10 and the treatment process employed. Biological nutrient removal (BNR) sludge is one example of microbial sludge that is produced as a waste by-product of wastewater treatment. By controlling treatment stages of aerobic, anoxic, and anaerobic conditions of high nitrogen and phosphorus concentration wastewater streams, such as anaerobic digester effluent, BNR microorganisms grow and accumulate high concentrations of phosphorus in their microbial cells. This results in reduced phosphorus concentrations in wastewater 10. By treating BNR sludge to cause substantial cell lysis, for example in a sludge treatment unit 34, the stored nitrogen and phosphorus in the microbial cells is released into the soluble phase, resulting in an opportunity to produce chemically precipitated phosphorus such as calcium phosphate or magnesium ammonium phosphate that can be used as a nutrient source (fertilizer) to sustain ongoing wastewater treatment or for recovery from the treated sludge stream.

EXAMPLES

The following examples further illustrate the invention in greater detail although it will be appreciated that the invention is not limited to the specific examples.

Example 1—WAS Degradation Using Different Sludge Treatment Technologies

By way of exemplary hypothetical example, a wastewater treatment plant produces as a byproduct 8 dry tonnes of WAS 22 per day having an 80% volatile solids content. Without sludge treatment in unit 34 or anaerobic digestion in anaerobic digester 24, 8 dry tonnes of WAS 22 per day would require dewatering and disposal. Without sludge treatment in treatment unit 34, but with anaerobic digestion functioning at 40% volatile solids reduction (VSr), about 5.5 dry tonnes of WAS 22 per day would require dewatering and disposal.

In accordance with a first embodiment of the invention configured as illustrated in FIG. 5A, employing high efficiency cell lysis treatment in sludge treatment unit 34, 100 m³ of thickened WAS 22 at 8% solids concentration is processed per day in a MicroSludge® cell disrupter/homogenizer achieving about 99.9% cell lysis. The TAS 36 derived therefrom is then anaerobically digested in anaerobic digester 24 (FIG. 6A) and returned to the aerobic treatment apparatus 14. The solids content of TAS 36 is then substantially degraded in treatment apparatus 14. Thus the combined effect of the three process steps, namely cell lysis treatment in sludge treatment unit 34, anaerobic digestion in anaerobic digester 24 and aerobic treatment in aerobic digester 14 results in 8 dry tonnes of WAS 22 being substantially degraded, resulting in no WAS 22 for dewatering and disposal. A small amount of VSS is discharged in treated effluent 18.

In accordance with a second embodiment of the invention configured as illustrated in FIG. 5B, employing low efficiency cell lysis treatment in sludge treatment unit 34, approximately 80,000 m³ per day activated sludge 23 (combined RAS 20 and WAS 22) at 1% solids concentration is processed using an ultrasound or high shear technology achieving about 10% cell lysis. The TAS 36 derived therefrom is then anaerobically digested in anaerobic digester 24 (FIG. 6A) and returned to the aerobic treatment apparatus 14. As in the first embodiment described in this example, the solids content of TAS 36 is then substantially degraded in treatment apparatus 14. Thus the combined effect of the three process steps, namely cell lysis treatment in treatment unit 34, anaerobic digestion in anaerobic digester 24 and aerobic treatment in aerobic digester 14 once again results in 8 dry tonnes of WAS 22 being destroyed, resulting in no WAS 22 for dewatering and disposal. A small amount of VSS is discharged in treated effluent 18.

Although in the second embodiment of FIG. 5B a much higher volume of activated sludge is treated in sludge treatment unit 34 and anaerobic digester 24 than in the first embodiment, the total reduction in activated sludge mass requiring dewatering and disposal is the same. Further, since the cell lysis efficiency is lower in the second embodiment, a sufficient number of microbial viable cells is returned to aerobic treatment apparatus 14 to sustain the aerobic treatment process and a separate return of RAS 20 is not required.

As exemplified by this example, activated sludge treatment with a high level of cell lysis on a relatively small volume of sludge or sludge treatment with a low level of cell lysis on a relatively large volume of sludge can both achieve a sufficient mass of solids destruction substantially equal to the mass of activated sludge cell growth so sludge dewatering is not needed.

Example 2—Comparison Pilot Study with Anaerobic Treatment

Figure 10A:
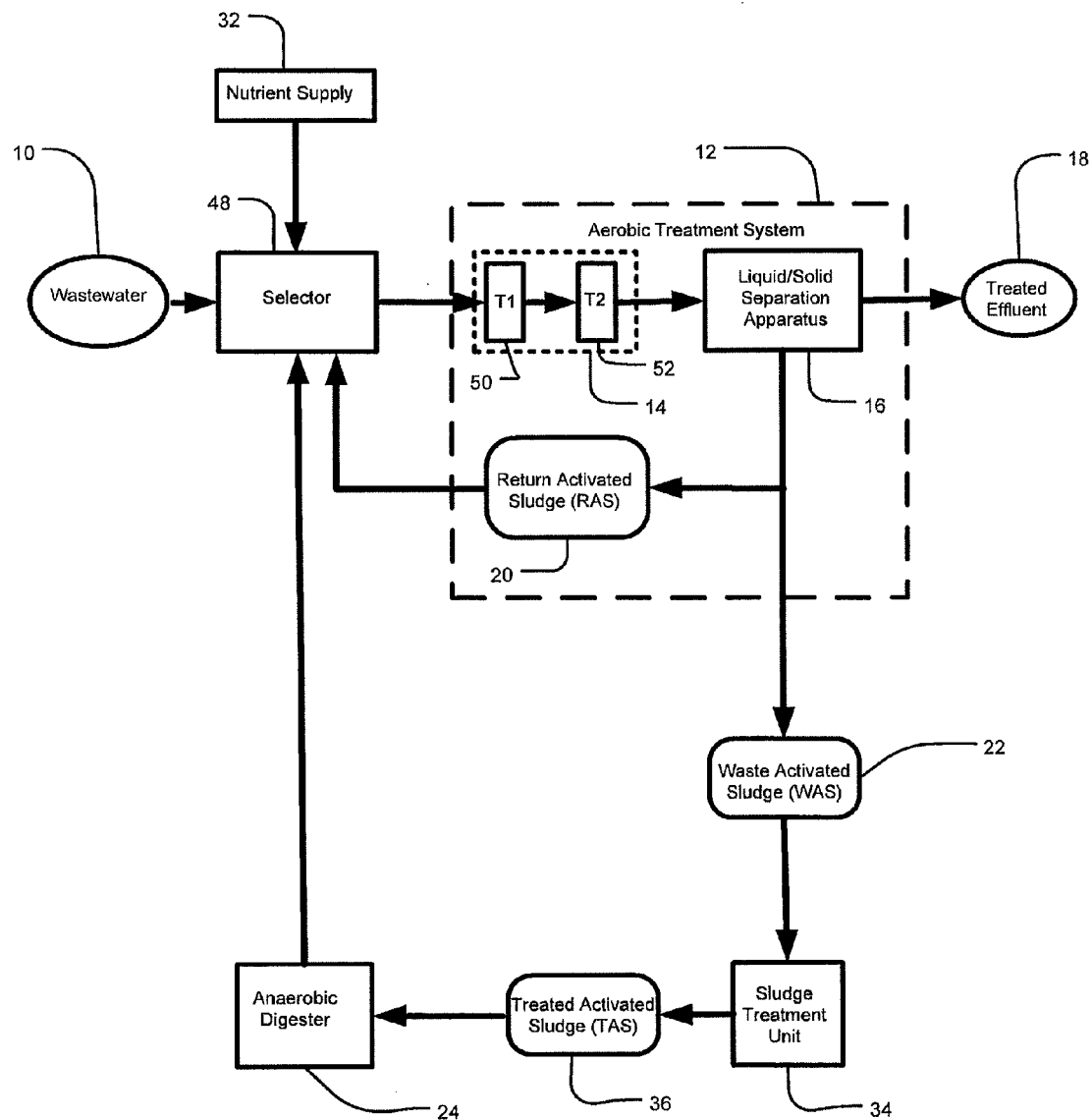
FIG. 10A is a schematic view of an embodiment of the invention configured in accordance with an experimental example.
Figure 11:
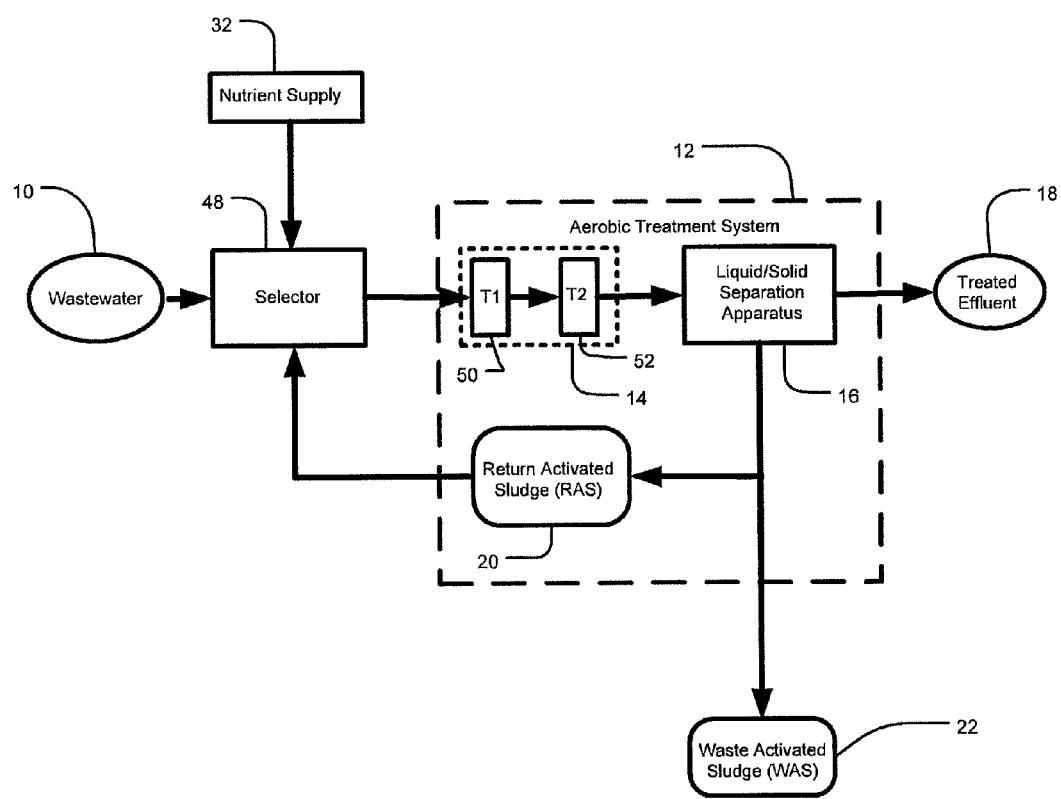
FIG. 11 is a schematic view of a wastewater process and system configured in accordance with an experimental control.

A pilot study was performed to compare the operation of an activated sludge aerobic effluent treatment plant operated in accordance with the invention (System A) with a conventional treatment plant (System B).
Description of Operations
FIGS. 10A and 11 illustrate schematically the operations of System A and System B respectively. Both System A and System B received the same pulp mill wastewater 10. Wastewater 10 was first delivered to a selector 48 located upstream from aerobic treatment apparatus 14. Selector 48 was a stainless steel container having a volume of approximately 30 L. As described further below, urea or APP nutrients were introduced into wastewater 10 from a nutrient supply 32 in fluid communication with selector 48. In both System A and System B the aerobic treatment apparatus 14 comprised two separate bioreactors T1 (50) and T2 (52). Bioreactors 50 and 52 were connected in series and were each stainless steel containers having a volume of approximately 500 L. Bioreactor 50 received influent from selector 48 and bioreactor 52 was connected to liquid/solid separation apparatus 16 consisting of a stainless steel conical clarifier having a volume of approximately 325 L.

In both System A and System B return activated sludge (RAS) 20 was recirculated from liquid/solid separation apparatus 16 to bioreactor 50 via selector 48. Waste activated sludge (WAS) 22 was however handled differently in each system. In System A WAS 22 was subjected to caustic treatment at 150 mg/L Na+ prior to cell lysis in WAS treatment unit 34. Treatment unit 34 consisted of a MicroSludge® high pressure cell disrupter/homogenizer as described in U.S. Pat. No. 6,013,183, entitled Method of Liquefying Microorganisms Derived from Biological Wastewater Treatment Processes, which is hereby incorporated by reference. The homogenization process in the MicroSludge® cell disruptor/homogenizer was operated at 10,000 psi and yielded treated activated sludge (TAS) 36 which was pumped at a constant rate to a 37° C. single stage, liquid recirculation mixed anaerobic digester 24 with a hydraulic residence time (HRT) of 5.5 days. Following anaerobic treatment, TAS 36 was returned to bioreactor 50 via selector 48 where it combined with the mill wastewater infeed 10 and RAS 20. System B operated as a control with no further processing or return of WAS 22 downstream of aerobic treatment system 12 (see FIG. 11).

The flow rate, temperature, pH and dissolved oxygen content parameters for both System A and System B were the same. More particularly, the flow rate of mill wastewater 10 was 2.00 L/min for both System A and System B. The daily feeding rate of TAS 36 to aerobic treatment system 12 in System A was 54.5 L/day. This resulted in a hydraulic residence time (HRT) in aerobic treatment apparatus 14 of 8.5 hours for System A and 8.6 hours for System B. The RAS 20 flow rate for both System A and System B was 1.0 L/min, or 50% of the infeed flow rate of wastewater 10.

In both System A and System B the rate of discharge of WAS 22 from liquid/solid separation apparatus (clarifier) 16 was adjustable using a user-controlled pump. In System A, WAS 22 was removed from apparatus 16 at a rate of about 54.5 L/day (since System A is a "closed loop" the discharge rate of WAS 22 and feed rate of TAS 36 are the same in this example). In System B, WAS 22 was removed at a rate on average of 69.7 L/day. At an average total suspended solids (TSS) concentration of 19,997 mg/L, the mass of WAS 22 removed from apparatus 16 was 1,090 g/day in System A. At an average TSS concentration of 8,044 mg/L, the mass of WAS 22 removed from apparatus 16 in System B was 560 g/day. Thus the mass of WAS 22 discharged from liquid/solid separation apparatus 16 in System A constituted 95% greater mass than in System B.

Bioreactors 50, 52 were stable and not significantly different. The average temperature of each bioreactor 50, 52 in both Systems A and B was 29 to 31° C. The pH of the two activated sludge systems in aerobic treatment system 12 was 7.5 to 7.6 and was consistent with well-run activated sludge operations and not significantly different from each other. The dissolved oxygen (DO) concentrations of the activated sludge bioreactors 50, 52 averaged 2.5 mg/L and were achieved with low variability.

Comparative Results
Sludge Age

The sludge age for System A and System B are compared in Table 1 below. Sludge age is the total amount of volatile suspended solids (VSS) in bioreactors 50, 52 (T1+T2) divided by the amount of solids leaving the aerobic treatment system 12 as (1) treated effluent 18 overflowing the weirs of liquid/solid separation apparatus (clarifer) 16; and (2) WAS 22, i.e.

Sludge age (days)=mass (VSS($T1+T2$)/mass (VSS)/day (clarifier+WAS)

As set forth in Table 1, the sludge age was calculated to be 3.0 days in System A and 4.2 days in System B.

TABLE 1

| | | Sludge Age | | |
|---|---|---|---|---|
| | Units | Location | System A | System B |
| Volume | L | | 1,034 | 1,034 |
| WAS Flow | L/day | | 54.5 | 69.7 |
| Clarifier Overflow | L/day | | 3,022 | 2,851 |
| VSS concentration | mg/L | T1 | 2,807 | 2,311 |
| | | T2 | 2,645 | 2,237 |
| | | Clarifier O/F | 27 | 24 |
| | | WAS | 18,673 | 6,987 |
| VSS mass | g | T1 | 1,451 | 1,195 |
| | | T2 | 1,367 | 1,157 |
| | | T1 + T2 | 2,818 | 2,352 |
| | g/day | Clarifier O/F | 82 | 68 |
| | | WAS | 848 | 487 |
| | | Clarifier O/F + WAS | 930 | 555 |
| Sludge Age* | days | | 3.0 | 4.2 |

*Sludge Age (days) = mass VSS (T1 + T2)/mass VSS/day (Clarifier + WAS)

Specific Oxygen Uptake Rate

The specific oxygen uptake rate (SOUR) did not vary significantly between System A and System B. In particular, per mass of VSS, the average specific oxygen uptake rate (SOUR) was 15.5 mg/hr/g VSS for System A and 13.0 mg/hr/g VSS for System B. This 19% increase in microbial activity in System A indicates there was no accumulation of non-biologically active VSS in System A or any other significant impact of TAS 36 recirculation on the SOUR.

Chemical Oxygen Demand

On average, the total chemical oxygen demand (tCOD) of the mill wastewater 10 was 1,110 mg/L. The tCOD of TAS 36 averaged 48,188 mg/L, resulting in a combined feed of 1,959 mg/L tCOD to the aerobic treatment system 12 of System A. Similar tCOD concentrations of 463 mg/L tCOD (System A) and 461 mg/L tCOD (System B) in the treated effluent 18 overflowing from liquid/solid separation apparatus (clarifier) 16 indicate that all of the TAS 36 was aerobically biodegraded (to $CO_2$ and microbes) in aerobic treatment system 12 of System A. That is, although TAS 36 increased the tCOD of the feed delivered to System A by 77%, this added load was accommodated by the aerobic treatment system 12; the influent tCOD was reduced by 76.5% in System A and 58.5% in System B.

Biological Oxygen Demand

The average biological oxygen demand (BOD) concentration of feed wastewater 10 for both Systems A and B was 265 mg/L. The average BOD for TAS 36 discharged from anaerobic digester 24 and recirculated to aerobic treatment system 12 in System A was 1,557 mg/L. The mass of BOD of anaerobically digested TAS 36 constituted just 6.4% of the mass of BOD in the mill wastewater 10. On this basis, the added aeration demand in aerobic treatment system 12 of System A was not a large proportion of the overall demand.

The average BOD concentrations for effluent 18 overflowing from the weirs of liquid/solid separation apparatus (clarifier) 16 in System A and B were 14 mg/L and 15 mg/L respectively. This corresponds to 95% BOD reduction in System A and 94% BOD reduction in System B. Thus both systems achieved sufficient BOD reduction to satisfy typical effluent discharge requirements.

Nutrient Supplementation

In order to measure the extent to which anaerobically digested TAS 36 could displace the requirement for purchased fertilizer, urea was added to System A at 25% of the concentration that was fed to System B (i.e. from nutrient supply 32 to selector 48) and no APP was added to System A. In particular, for System A, the only nutrient supplementation was 2 L/day of urea solution at a concentration of 4,518 mg nitrogen/L, which corresponds to 9 g of nitrogen fertilizer added per day. For System B, 2 L of urea solution at a concentration of 18,073 mg nitrogen/L was added each day resulting in the addition of a mass of 37 g of nitrogen/day. Additionally, 2 L/day of ammonium polyphosphate was added to System B with a concentration in APP of 1,416 mg nitrogen/L and 2,095 mg phosphorus/L. In total, 38.9 g nitrogen/day and 4.2 g phosphorus/day were added to System B in the form of urea and APP fertilizers. The nutrient requirements for System B were based on a BOD:N:P ratio of 100:4.9:0.7 as was employed by the mill's effluent treatment plant.

On average, the TAS 36 contained 1,768 mg/L total nitrogen, 651 mg/L ammonia, and 303 mg/L phosphate. Table 2 shows the concentration of total nitrogen, ammonia, and phosphate in the feed effluent 10 and the treated effluent 18 overflowing from liquid/solid separation apparatus (clarifier) 16 for both Systems A and B. Table 2 shows that adding anaerobically digested TAS 36 to the wastewater feed of System A reduced the requirement for added nitrogen fertilizer by at least 77%. In some cases it may be possible to avoid addition of supplemental nitrogen fertilizer entirely. Table 2 also shows that adding TAS 36 to System A eliminated entirely the need to add APP (phosphate) fertilizer, since the total phosphate concentration in the treated effluent 18 in System A exceeded the mill's target concentration.

TABLE 2

Nutrients in Discharge

| Parameter | Units | Feed A | Feed B | System A clarifier overflow | System B clarifier overflow | Target |
|---|---|---|---|---|---|---|
| Total Nitrogen | mg/L | 35.6 | 3.4 | 5.41 | 3.49 | — |
| NH₃ | mg/L | 11.78 | 0.03 | 0.83 | <0.1 | 0.1-0.3 |
| PO₄ | mg/L | 7.80 | 2.38 | 1.44 | 0.54 | 0.3-0.7 |

Sludge Volume Index

As indicated above, the sludge volume index (SVI) is the volume in milliliters occupied by 1 g of a suspension after 30 minutes of settling. SVI is thus a measure of the effectiveness of the liquid/solid separation apparatus (clarifier) 16 in separating solids from liquids by settling. A higher SVI indicates less effective settling and hence less effective clarifier operation.

On average, the sludge volume index (SVI) for System A was 186 ml/g and 324 ml/g for System B. Thus the average SVI of System A was excellent and significantly lower than that of System B, indicating significantly better clarification.

Suspended Solids

The average total suspended solids (TSS) and volatile suspended solids (VSS) concentrations for all stages of the System A and B operations are compared in Table 3.

TABLE 3

TSS and VSS

| | System A | | System B | |
| | | | TSS | |
| Location | TSS [mg/L] | VSS [mg/L] | [mg/L] | VSS [mg/L] |
|---|---|---|---|---|
| Feed | 430 | 385 | 71 | 50 |
| T1 | 3,171 | 2,807 | 2,602 | 2,311 |
| T2 | 3,148 | 2,645 | 2,552 | 2,237 |
| Clarifier overflow | 33 | 27 | 37 | 24 |
| WAS | 19,997 | 18,673 | 8,044 | 6,987 |

Table 3 indicates that TSS in the treated effluent 18 (clarifier overflow) of both Systems A and B were less than the permitted 50 mg/L effluent discharge limit.

Anaerobic Digestion

The effects in System A on solubilization of nitrogen and phosphorus (i.e. MicroSludge® treatment in sludge treatment unit 34 to produce TAS 36) followed by anaerobic digestion in anaerobic treatment system 24 (5.5 day hydraulic residence time (HRT)) were as follows:

1. Soluble total Kjeldhal nitrogen (TKN), i.e. the sum of organic nitrogen, ammonia and ammonium in a sample, increased to 53% of the total TKN in the anaerobically digested TAS 36 compared to approximately 10% soluble TKN in WAS 22.
2. Soluble total nitrogen increased to 44% of the total nitrogen in the anaerobically digested TAS 36 compared to approximately 10% soluble nitrogen in WAS 22.
3. Ammonia increased to 32% of the total TKN in the anaerobically digested TAS 36 compared to approximately 2% ammonia in WAS 22.
4. Soluble phosphate increased to 87% of the total phosphate in anaerobically digested TAS 36 compared to approximately 39% soluble phosphate in WAS 22.

Solids for Disposal

Table 4 compares the total suspended solids (TSS) disposed of in System A and System B. The TSS component in treated effluent 18 in System A and System B was approximately the same, namely 103 and 105 g/day respectively. In System A no WAS 22 was dewatered or disposed of whereas in System B it was necessary to dispose of 264 g/day WAS 22. For System A, managing WAS 22 as TAS 36 rather than as dewatered WAS 22 for disposal represents significant and on-going cost savings to the mill.

TABLE 4

TSS for Disposal

| Process Stream | System A | System B |
|---|---|---|
| Clarifier Overflow: | | |
| Flow Rate (L/day) | 3,110* | 2,851 |
| TSS Concentration (mg/L) | 33 | 37 |
| Mass of TSS (g/day) | 103 | 105 |
| WAS: | | |
| Flow Rate (L/day) | 0 | 32.8 |
| TSS Concentration (mg/L) | 0 | 8,044 |
| Mass of TSS (g/day) | 0 | 264 |
| Total Mass of TSS (g/day) | 103 | 369 |

*Includes decanted liquid during TAS collection

Conclusions

Several conclusions can be drawn from this example. In System A substantially all of WAS 22 produced by aerobic treatment system 12 was successfully treated, recirculated as TAS 36, and degraded, thereby eliminating the need for WAS 22 dewatering and disposal.

While the invention increased the chemical oxygen demand (COD) load to aerobic treatment system 12 in System A, the similar tCOD concentrations in the treated effluent 18 (clarifier overflow) of systems A and B indicate that all or substantially all of TAS 36 was aerobically biodegraded in aerobic treatment system 12 without altering the HRT.

The conditions under which the invention of System A was performed improved the performance of the liquid/solid separation device (secondary clarifier) 16, with an average SVI almost half of that of the system fed with mill wastewater only (System B).

No accumulation of non-biologically active volatile suspended solids (VSS) in System A or any other significant impact of TAS 36 was detected based on the average specific oxygen uptake rate (SOUR) being approximately equal for the two systems.

At least 75% displacement of the nitrogen fertilizer required to be added to aerobic treatment system 12 of System A was demonstrated. Since ammonia levels in the treated effluent 18 (clarifier overflow) in System A exceeded the mill's guidelines, further reduction of urea addition is indicated. Urea addition to aerobic treatment system 12 might be eliminated altogether for pulp mill wastewater 10 of the type used in the pilot study.

No phosphorus addition was needed in the case of System A. In fact, the phosphate levels in the liquid/solid separation apparatus (clarifier) 16 of System A exceeded the mill's guidelines.

Example 3—Comparison Pilot Study with No Anaerobic Treatment

Figure 10B:
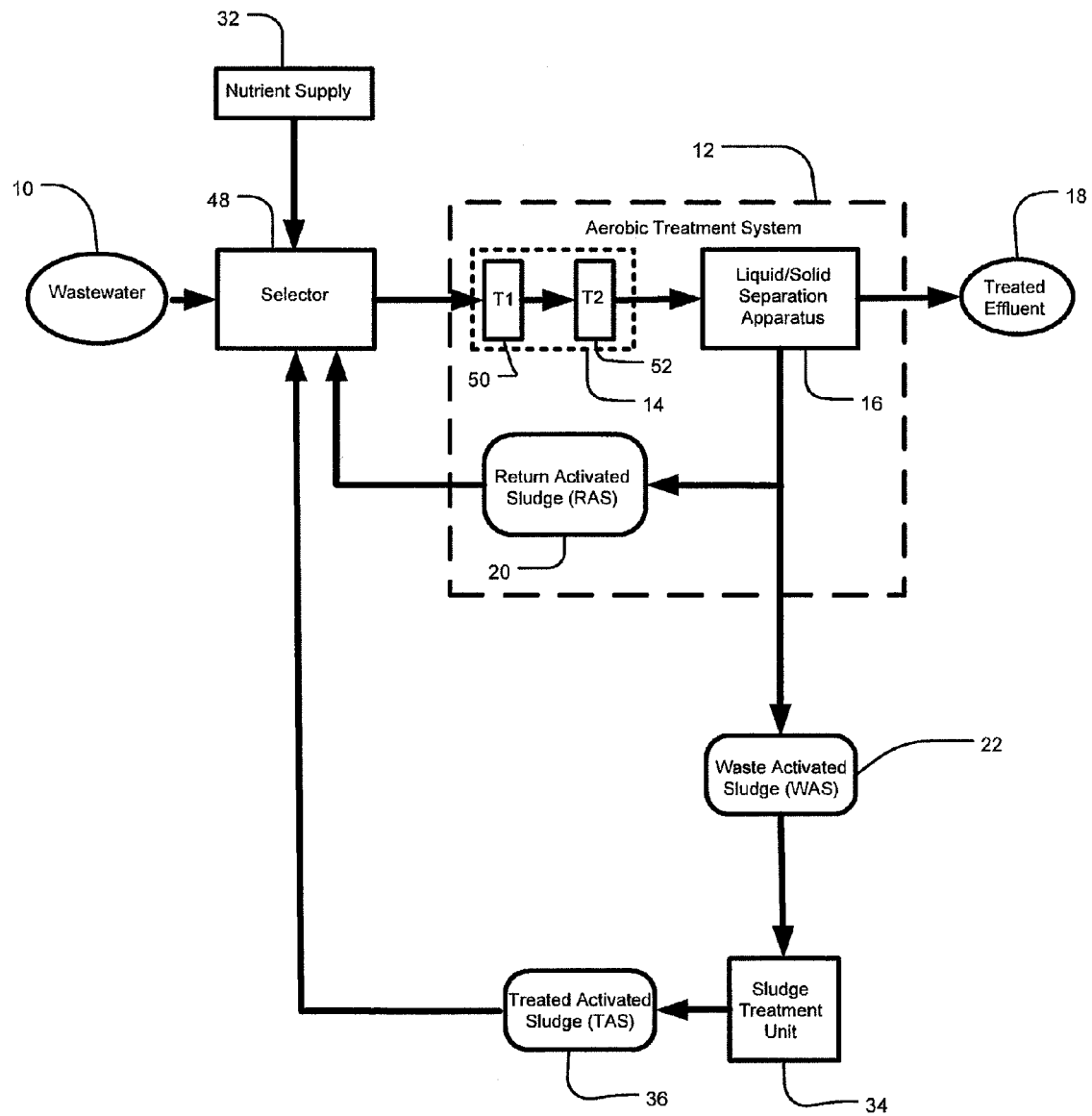
FIG. 10B is a schematic view of an embodiment of the invention configured in accordance with an alternative experimental example.

A further pilot study was performed to compare the operation of an aerobic treatment system 12, namely an activated sludge aerobic effluent treatment plant operated in accordance with the invention (System A) with a conventional treatment plant (System B). FIGS. 10B and 11 illustrate schematically the operations of System A and System B respectively in this example. System A was configured as in the embodiment of Example 2 (FIG. 10A) except that the step of anaerobic treatment was omitted.

Description of Operations

As in Example 2, both System A and System B received the same pulp mill wastewater 10. Wastewater 10 was first delivered to a selector 48 located upstream from aerobic treatment apparatus 14. Selector 48 was a stainless steel container having a volume of approximately 30 L. As described further below, urea or APP nutrients were introduced into wastewater 10 from a nutrient supply 32 in fluid communication with selector 48. In both System A and System B the aerobic treatment apparatus 14 comprised two separate bioreactors T1 (50) and T2 (52). Bioreactors 50 and 52 were connected in series and were each stainless steel containers having a volume of approximately 500 L. Bioreactor 50 received influent from selector 48 and bioreactor 52 was connected to liquid/solid separation apparatus 16 consisting of a stainless steel conical clarifier having a volume of approximately 325 L.

In both System A and System B return activated sludge (RAS) 20 was recirculated from liquid/solid separation apparatus 16 to bioreactor 50 via selector 48. Waste activated sludge (WAS) 22 was however handled differently in each system. In System A WAS 22 was subjected to caustic treatment at 150 mg/L Na+ prior to cell lysis in WAS treatment unit 34. Treatment unit 34 consisted of a MicroSludge® high pressure cell disrupter/homogenizer as described in U.S. Pat. No. 6,013,183, entitled Method of Liquefying Microorganisms Derived from Biological Wastewater Treatment Processes, which is hereby incorporated by reference. The homogenization process in the MicroSludge® cell disruptor/homogenizer was operated at 10,000 psi and yielded treated activated sludge (TAS) 36 which was returned to bioreactor 50 via selector 48 where it combined with the mill wastewater infeed 10 and RAS 20. System B operated as a control with no further processing or return of WAS 22 downstream of aerobic treatment system 12 (see FIG. 11).

The volume of mill effluent for treatment at full scale averaged approximately 152,820 m3 per day, resulting in 30.3 dry tonnes total solids (TS) of WAS 22 on average each day. That is, one dry tonne of WAS 22 was produced for each 5,044 m3 of mill effluent treated. On this basis, pilot scale activated sludge treatment of 2,900 L/day of mill wastewater 10 in this example would produce 0.57 kg dry solids of WAS 22 or about 9.6 L of WAS 22 per day at a WAS concentration of 6% TS.

Approximately 5 L/day of TAS 36 was fed into selector 48 along with wastewater 10 at an HRT of approximately 8 hours. Proportionately, this represented approximately half of the mill's production of WAS 22. System B was fed wastewater 10 only, also at an HRT of approximately 8 hours.

The flow rate, temperature, pH and dissolved oxygen content parameters for both System A and System B were the same. More particularly, the flow rate of wastewater 10 was 2.00 L/min (approximately 2,900 L/day) for both System A and System B. The RAS 20 flow rate for both System A and System B was 1.0 L/min, or 50% of the infeed flow rate of wastewater 10.

In both System A and System B the rate of discharge of WAS 22 from liquid/solid separation apparatus (clarifier) 16 was adjustable using a user-controlled pump. In System A, WAS 22 was removed from apparatus 16 at a rate of about 44.28 L/day. In System B, WAS 22 was removed at a rate on average of 43.78 L/day. At an average total suspended solids (TSS) concentration of 6,131 mg/L, the mass of WAS 22 removed from apparatus 16 was 271 g/day in System A. At an average TSS concentration of 4,996 mg/L, the mass of WAS 22 removed from apparatus 16 was 219 g/day in System B. Thus the mass of WAS 22 discharged from liquid/solid separation apparatus 16 in System A constituted 24% greater mass than in System B.

Bioreactors 50, 52 were stable and not significantly different. The average temperature of each bioreactor 50, 52 in both Systems A and B was 32° C. The pH of the two activated sludge systems in aerobic treatment system 12 was 7.2 to 7.3 and was consistent with well-run activated sludge operations and not significantly different from each other. The dissolved oxygen (DO) concentrations of the activated sludge bioreactors 50, 52 averaged 2.5 mg/L and were achieved with low variability.

Comparative Results

Sludge Age

The sludge age for System A and System B are compared in Table 5 below. As explained above, sludge age is the total amount of volatile suspended solids (VSS) in bioreactors 50, 52 (T1+T2) divided by the amount of solids leaving the aerobic treatment system 12 as (1) treated effluent 18 overflowing the weirs of liquid/solid separation apparatus (clarifer) 16; and (2) WAS 22, i.e.

Sludge age (days)=mass(VSS($T1+T2$)/mass (VSS)/day(clarifier+WAS)

TABLE 5

Sludge Age Calculation

| | Units | Location | System A | System B |
|---|---|---|---|---|
| Volume | L | | 1,034 | 1,034 |
| WAS Flow | L/day | | 44.28 | 43.78 |
| Clarifier Overflow | L/day | | 2,880 | 2,808 |
| VSS concentration | mg/L | T1 | 2,108 | 1,850 |
| | | T2 | 2,310 | 1,623 |
| | | Clarifier O/F | 27 | 73 |
| | | WAS | 5,498 | 4,504 |
| VSS mass | g | T1 | 1,090 | 956 |
| | | T2 | 1,194 | 839 |
| | | T1 + T2 | 2,284 | 1,795 |
| | g/day | Clarifier O/F | 78 | 204 |
| | | WAS | 243 | 197 |
| | | Clarifier O/F + WAS | 321 | 401 |
| Sludge Age* | days | | 7.1 | 4.5 |

*Sludge Age (days) = mass VSS (T1 + T2)/mass VSS/day (Clarifier + WAS)

As set forth in Table 5, the sludge age was calculated to be 7.1 days in System A and 4.5 days in System B. Although in this example the sludge age was longer in System A rather than System B, the specific oxygen uptake rate (SOUR) and sludge volume index (SVI) did not vary significantly between Systems A and B as explained below.

Specific Oxygen Uptake Rate

The average oxygen uptake rate (OUR) was 27.6 mg/L and 17.6 mg/L for systems A and B respectively. Per mass of VSS, the average specific oxygen uptake rate (SOUR) was 12.8 mg/hr/g VSS and 9.50 mg/hr/g VSS for systems A and B respectively. This indicates no significant impact of introducing TAS 36 on the SOUR of systems A and B. The specific oxygen uptake rate (SOUR) did not vary significantly between System A and System B.

Chemical Oxygen Demand

The TAS 36 fed to aerobic treatment system 12 had an average COD of 99,628 mg/L and an average soluble COD of 29,339 mg/L. For 5 L/day of TAS 36 blended with 2,880 L/day of wastewater 10, the calculated average feed in System A was 1,282 mg/L tCOD and 1,191 mg/L sCOD. On average, the COD reduction of the aerobic treatment systems 12 was 64% in System A and 50% in System B.

Biological Oxygen Demand

The average biological oxygen demand (BOD) concentration of feed wastewater 10 for both Systems A and B was 249 mg/L. The average BOD concentrations for effluent 18 overflowing from the weirs of liquid/solid separation apparatus (clarifier) 16 in System A and B were 14 mg/L and 13 mg/L respectively. This corresponds to 95% BOD reduction in both Systems A and B. Thus both systems achieved sufficient BOD reduction to satisfy typical effluent discharge requirements.

Nutrient Supplementation

Nutrient requirements were based on the average BOD of the primary clarifier effluent, the feed flow rate, and a BOD:N:P ratio of 100:4.9:0.7 as was employed by the mill's effluent treatment plant.

The average feed rates of 21 ml urea/L and 1.6 ml APP/L water are shown in Table 6.

TABLE 6

Nutrient Addition

| Nutrient | Target Flow Rate [L/d] | System A Flow Rate [L/d] | System B Flow Rate [L/d] |
|---|---|---|---|
| Urea | 2.0 | 2.12 | 2.07 |
| APP | 2.0 | 2.09 | 2.05 |

The data shows that the flow rates of urea and APP to systems A and B were not significantly different and had low variability. On average, TAS 36 contained 3,607 mg/L TKN, but only 61 mg/L was present as ammonia. TAS 36 also contained 1,261 mg/L of total phosphate, 55% of which was soluble.

Table 7 indicates that the addition of nitrogen and phosphorus fertilizers to both systems A and B could be substantially reduced, based on the average effluent concentration of ammonia and phosphorus in the clarifier overflow.

TABLE 7

Nutrients in discharge

| Parameter | Units | Feed A | Feed B | System A clarifier overflow | System B clarifier overflow | Target |
|---|---|---|---|---|---|---|
| Total Nitrogen | mg/L | — | 3.3 | 11.0 | 7.7 | 0.1-0.3 |
| $NH_3$ | mg/L | 0.50 | 0.40 | 0.4 | 0.6 | — |
| $PO_4$ | mg/L | 2.4 | 2.0 | 3.0 | 1.2 | 0.3-0.7 |

Sludge Volume Index

As indicated above, the sludge volume index (SVI) is the volume in milliliters occupied by 1 g of a suspension after 30 minutes of settling. SVI is thus a measure of the effectiveness of the liquid/solid separation apparatus (clarifier) 16 in separating solids from liquids by settling. A higher SVI indicates less effective settling and hence less effective clarifier operation.

On average, the SVI was 139 ml/g for System A and 156 ml/g for System B. Due to high variability, there was no statistically significant difference in SVI between Systems A and B.

Suspended Solids

The average total and volatile suspended solids concentrations for all stages of the activated sludge systems are listed in Table 8. The data indicates that although System A contained higher solids concentrations than System B, the lower TSS in the clarifier overflow indicates better performance of liquid/solid separation apparatus (clarifier) in System A as compared to System B.

TABLE 8

TSS and VSS

| | System A | | System B | |
|---|---|---|---|---|
| Location | TSS [mg/L] | VSS [mg/L] | TSS [mg/L] | VSS [mg/L] |
| Feed | 121 | 112 | 52 | 41 |
| T1 | 2,348 | 2,108 | 2,018 | 1,850 |
| T2 | 2,585 | 2,310 | 1,783 | 1,623 |
| Clarifier overflow | 30 | 27 | 73 | 73 |
| WAS | 6,131 | 5,498 | 4,996 | 4,504 |

Cell Yield

In the process of reducing BOD, the aerobic treatment system 12 generates biomass. The amount of biomass produced (VSS) per BOD reduced is termed the cell yield. A typical system 12 has a cell yield of 0.5 gVSS/gBODr.

To assess the impact on net solids production due to feeding TAS 36 to aerobic treatment system 12, Tables 9 and 10 show the data for the cell yield calculation for System A and B respectively.

TABLE 9

System A VSS and BOD

|  | Calculation | Feed | Clarifier Overflow (OF) | WAS |
|---|---|---|---|---|
| Flow Rate (L/day) | Q | 2,880 | 2,836 | 44.28 |
| VSS Conc. (mg/L) | VSS | 41 | 27 | 5,498 |
| Mass of VSS (g/day) | $\frac{Q*VSS}{1000}$ | 331 | 76 | 243 |
| BOD Conc. (mg/L) | BOD | 230 | 7 | — |
| Mass of BOD (g/day) | $\frac{Q*BOD}{1000}$ | 662 | 20 | — |

The volatile suspended solids (VSS) produced by converting BOD into microbial cells is determined by subtracting the mass of VSS fed to aerobic treatment system 12 from the mass of VSS leaving system 12 via the overflow (OF) of liquid/solid separation apparatus (clarifier) 16 and in WAS 22. This is represented in the following equation:

$$\frac{VSS_{Produced}}{day} = VSS_{OF}*Q_{OF} + VSS_{WAS}*Q_{WAS} - VSS_{Feed}*Q_{Feed}$$

Based on the data in Table 9, the mass produced each day is calculated:

$$\frac{VSS_{Produced}}{day} = 76 + 243 - 331 = 12 \text{ g/day}$$

The mass of BOD reduced is the difference between the mass of BODFeed and the mass of BODOF (662−20=642). Using the equation for cell yield:

$$\text{Cell yield} = \frac{gVSS \text{ produced}}{gBOD \text{ reduced}}$$

$$\text{System A Cell yield} = \frac{12}{642} = 0.02 \text{ g } VSS/\text{g } BODr$$

This is an extraordinarily low value compared to the cell yield of typical activated sludge effluent treatment plants. The same calculations for system B, based on the data in Table 10, indicate a very different cell yield compared to System A.

TABLE 10

System B VSS and BOD

|  | Calculation | Feed | Clarifier Overflow (OF) | WAS |
|---|---|---|---|---|
| Flow Rate (L/day) | Q | 2,808 | 2,767 | 43.78 |
| VSS Conc. (mg/L) | VSS | 41 | 73 | 4,504 |
| Mass of VSS (g/day) | $\frac{Q*VSS}{1000}$ | 115 | 202 | 197 |
| BOD Conc. (mg/L) | BOD | 230 | 7 | — |
| Mass of BOD (g/day) | $\frac{Q*BOD}{1000}$ | 645 | 19 | — |

The cell yield for System B is calculated as follows:

$$\frac{VSS_{Produced}}{day} = 202 + 197 - 115 = 284 \text{ g/day}$$

The BOD reduced is the difference between the mass of BODFeed and the mass of BODOF (645−19=626).

$$\text{System B Cell yield} = \frac{284}{626} = 0.45 \text{ g } VSS/\text{g } BODr$$

The sludge yield of 0.45 g VSS produced/g BODr for System B is within a typical range for effluent treatment plants.

In this example, adding TAS 36 to the mill wastewater 10 fed to System A resulted in 2.9 times higher solids loading compared to System B (331 g/day VSS to System A versus 115 g/day VSS to System B). However, the total mass of VSS for discharge was 20% less for System A than for System B (319 g/day VSS from A versus 399 g/day VSS from B). This unexpectedly positive result indicates that substantial aerobic destruction of TAS 36 occurred in aerobic treatment system 12.

In summary, adding TAS 36 to influent wastewater 10 in a proportion equivalent to roughly half the amount of WAS 22 produced by a pulp and paper mill resulted in no negative impacts on performance of either the aerobic treatment apparatus 14 or the liquid/solid separation apparatus (secondary clarifier) 16 in a pilot study.

A net reduction in VSS, rather than a cell yield indicating a net increase in VSS, suggests that all of the approximate 5 L/day TAS 36 added in System A was degraded in aerobic treatment system 12.

Further, elevated concentrations of nitrogen and phosphorus in the treated effluent 18 of System A indicate that less fertilizer would be required to operate aerobic treatment system 12 with recirculated TAS 36.

Example 4—Further Comparison Pilot Study with No Anaerobic Treatment

A further pilot study was performed to compare the operation of an aerobic treatment system 12 operated in accordance with the invention (System A) with a conventional treatment plant (System B). Except where noted, the experimental parameters were the same as Example 3 above except that approximately 11.5 L/day of MicroSludge® processed TAS 36 was fed into selector 48 together with wastewater 10 at an HRT of approximately 8 hours. Proportionately, this represented approximately 20% more than the mill's WAS production of one dry tonne of WAS 22 being produced for each 5,044 m3 of mill effluent treated. System B was fed wastewater 10 only, also at an HRT of approximately 8 hours.

In both System A and System B the rate of discharge of WAS 22 from liquid/solid separation apparatus (clarifier) 16 was adjustable using a user-controlled pump. In System A, WAS 22 was removed from apparatus 16 at a rate of about 52.57 L/day. In System B, WAS 22 was removed at a rate on average of 52.04 L/day. At an average total suspended solids (TSS) concentration of 6,780 mg/L, the mass of WAS 22 removed from apparatus 16 was 356 g/day in System A. At an average TSS concentration 5,493 mg/L, the mass of WAS 22 removed from apparatus 16 was 286 g/day in System B. Thus the mass of WAS 22 discharged from liquid/solid separation apparatus (clarifier) 16 in System A constituted 24% greater mass than in System B.

Comparative Results

Sludge Age

The sludge age for System A and System B are compared in Table 11 below. As set forth in Table 11, the sludge age was calculated to be 6.2 days in System A and 3.1 days in System B. Although in this example the sludge age was longer in System A rather than System B, the specific oxygen uptake rate (SOUR) and sludge volume index (SVI) did not vary significantly between Systems A and B as explained below.

TABLE 11

Sludge Age Calculation

| | Units | Location | System A | System B |
|---|---|---|---|---|
| Volume | L | | 1,034 | 1,034 |
| WAS Flow | L/day | | 52.57 | 52.04 |
| Clarifier Overflow | L/day | | 2,827 | 2,894 |
| VSS concentration | mg/L | T1 | 2,976 | 1,950 |
| | | T2 | 2,959 | 1,286 |
| | | Clarifier O/F | 57 | 75 |
| | | WAS | 6,279 | 6,264 |
| VSS mass | g | T1 | 1,539 | 1,008 |
| | | T2 | 1,530 | 664 |
| | | T1 + T2 | 3,069 | 1,673 |
| | g/day | Clarifier O/F | 164 | 217 |
| | | WAS | 330 | 326 |
| | | Clarifier O/F + WAS | 494 | 543 |
| Sludge Age* | days | | 6.2 | 3.1 |

*Sludge Age (days) = mass VSS (T1 + T2)/mass VSS/day (Clarifier + WAS)

Specific Oxygen Uptake Rate

The average oxygen uptake rate (OUR) was 25.7 mg/L and 18.3 mg/L for systems A and B respectively. Per mass of VSS, the average specific oxygen uptake rate (SOUR) was 8.6 mg/hr/g VSS and 9.4 mg/hr/g VSS for systems A and B respectively. This indicates no significant impact of introducing TAS 36 on the SOUR of systems A and B. The specific oxygen uptake rate (SOUR) did not vary significantly between System A and System B.

Chemical Oxygen Demand

The TAS 36 fed to aerobic treatment system 12 had an average COD of 92,044 mg/L. For 11.5 L/day of TAS 36 blended with 2,880 L/day of wastewater 10 with and average tCOD concentration of 1,076 mg/L the calculated average tCOD fed aerobic treatment system 12 in System A was 1,441 mg/L. On average, the COD reduction of the aerobic treatment systems 12 was 71% in System A and 50% in System B. System A achieved significantly greater sCOD reduction: 66% sCODr compared to 48% sCODr of system B, indicating that TAS 36 was aerobically biodegradable.

Biological Oxygen Demand

The average BOD of wastewater 10 fed to aerobic treatment system 12 in Systems A and B was 281 mg/L. The BOD concentrations for effluent 18 overflowing the weirs of liquid/solid separation apparatus (clarifier) 16 in System A and B were 16 mg/L and 24 mg/L respectively, or 94% BOD reduction for System A (not including the BOD from TAS 36) and 91% BODr for System B.

Nutrient Supplementation

As in Example 3, nutrient requirements were based on the average BOD of the primary clarifier effluent, the feed flow rate, and a BOD:N:P ratio of 100:4.9:0.7 as was employed by the mill's effluent treatment plant. The average feed rates of 21 ml urea/L and 1.6 ml APP/L water are shown in Table 12.

TABLE 12

Nutrient Addition

| Nutrient | Target Flow Rate [L/d] | System A Flow Rate [L/d] | System B Flow Rate [L/d] |
|---|---|---|---|
| Urea | 2.0 | 1.88 | 1.98 |
| APP | 2.0 | 1.43 | 2.21 |

The data shows that the flow rates of urea and APP to Systems A and B were not significantly different. On average, TAS 36 contained 3,414 mg/L TKN, but only 61 mg/L was present as ammonia. TAS 36 also contained 1,261 mg/L of total phosphate, 55% of which was soluble.

Adding 11.5 L/day of TAS 36 to wastewater 10 fed to aerobic treatment system 12 contributed nutrients. On average, the TAS 36 contained 3,414 mg/L TKN, of which 2,149 mg/L TKN was soluble. Without anaerobic digestion, only a small portion of nitrogen was present as ammonia (on average, only 32 mg/L). Relative to the nitrogen content, TAS 36 contained relatively high amounts of phosphorus: 1,260 mg/L of total phosphate, with 68% of the total phosphate as soluble.

Table 13 below indicates that the addition of nitrogen and phosphorus fertilizers to both Systems A and B could be substantially reduced based on the average effluent concentration of ammonia and phosphorus in the clarifier overflow.

TABLE 13

Nutrients in discharge

| Parameter | Units | Feed A | Feed B | System A clarifier overflow | System B clarifier overflow | Target |
|---|---|---|---|---|---|---|
| Total Nitrogen | mg/L | — | 3.72 | 9.5 | 4.9 | 0.1-0.3 |
| $NH_3$ | mg/L | 0.25 | 0.12 | 0.17 | 0.20 | — |
| $PO_4$ | mg/L | 6.49 | 1.47 | 3.86 | 0.40 | 0.3-0.7 |

Sludge Volume Index

On average, the SVI was 165 ml/g for System A and 210 ml/g for System B, indicating better settling in System A as compared to System B.

Suspended Solids

The average total and volatile suspended solids concentrations for all stages within the activated sludge systems are listed in Table 14. The data indicates that System A contained higher solids concentrations than System B, in part due to the added solids loading of TAS 36.

TABLE 14

TSS and VSS

|  | System A | | System B | |
|---|---|---|---|---|
| Location | TSS [mg/L] | VSS [mg/L] | TSS [mg/L] | VSS [mg/L] |
| Feed | 192 | 189 | 56 | 50 |
| T1 | 3,462 | 2,976 | 2,517 | 1,950 |
| T2 | 3,402 | 2,959 | 2,176 | 1,286 |
| Clarfier overflow | 63 | 57 | 79 | 75 |
| WAS | 6,780 | 6,279 | 5,493 | 5,101 |

Cell Yield

In the process of reducing BOD, aerobic treatment system 12 generates biomass. As explained above in Example 3, the amount of biomass produced (VSS) per BOD reduced is termed the cell yield. A typical aerobic treatment system 12 has a cell yield of 0.5 gVSS/gBODr. To assess the impact on net solids production due to feeding TAS 36 to aerobic, Tables 15 and 16 show the data for the cell yield calculation for System A and B respectively.

TABLE 15

System A VSS and BOD

| | Calculation | Feed | Clarifier Overflow (OF) | WAS |
|---|---|---|---|---|
| Flow Rate (L/day) | Q | 2,880 | 2,827 | 53.0 |
| VSS Conc. (mg/L) | VSS | 187 | 57 | 6,279 |
| Mass of VSS (g/day) | $\frac{Q*VSS}{1000}$ | 538 | 161 | 332 |
| BOD Conc. (mg/L) | BOD | 281 | 16 | — |
| Mass of BOD (g/day) | $\frac{Q*BOD}{1000}$ | 809 | 45 | — |

In this example the calculated cell yield for System A was −0.06. This cell yield, essentially zero, is an extraordinarily low value compared to the cell yield of typical aerobic treatment system 12. As was the case in Example 3, wherein 5 L/day of TAS 36 was added to the influent wastewater 10, the data shows a net reduction in VSS, rather than a cell yield. This shows that, even at 20% greater volume of WAS 22 added to aerobic treatment system 12 than would be produced by it from treating wastewater 10, more VSS in the feed were removed than was formed as a consequence of growing microbes to consume BOD. Such degradation of TAS 36 demonstrates the feasability of eliminating WAS 22 for dewatering and disposal.

The same calculations for System B, based on the data in Table 16, indicate a very different cell yield for the baseline aerobic treatment system 12 compared to System A.

TABLE 16

System B VSS and BOD

| | Calculation | Feed | Clarifier Overflow (OF) | WAS |
|---|---|---|---|---|
| Flow Rate (L/day) | Q | 2,894 | 2,842 | 52 |
| VSS Conc. (mg/L) | VSS | 50 | 75 | 5,101 |
| Mass of VSS (g/day) | $\frac{Q*VSS}{1000}$ | 146 | 213 | 265 |
| BOD Conc. (mg/L) | BOD | 281 | 24 | — |
| Mass of BOD (g/day) | $\frac{Q*BOD}{1000}$ | 813 | 68 | — |

The sludge yield of 0.44 g VSS produced/g BODr for system B is within a typical range for effluent treatment plants. Although System A received 3.7 times greater solids loading than System B (539 g/day VSS to A versus 146 g/day VSS to B) due to addition of TAS 36 to A, the mass of VSS for discharge was only 2% greater from System A (490 g/day VSS) than from B (479 g/day VSS). This suggests that substantially all of TAS 36 was degraded in the aerobic treatment system 12 in this example.

In summary, in this example adding TAS 36 to wastewater 10 in a proportion of roughly 120% of the amount of WAS 22 produced an aerobic treatment system 12 resulted in no negative impacts on performance of either aerobic treatment apparatus 14 or liquid/solid separation apparatus (secondary clarifier) 16 in a pilot study.

A near zero increase in VSS suggests that almost all of the TAS 36 added in System A was degraded in aerobic treatment system 12.

Elevated concentrations of nitrogen and phosphorus in treated effluent 18 of System A indicate that less fertilizer would be required to operate aerobic treatment system 12 fed with TAS 36.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A process for degrading sludge produced by treatment of wastewater comprising:
   (a) providing an aerobic treatment system receiving a supply of said wastewater;
   (b) treating a supply of said sludge by rupturing microbial cells present therein to produce treated sludge having an increased liquid:solid ratio and an increased degradation potential in comparison to untreated sludge;
   (c) conveying a supply of said treated sludge to said aerobic treatment system; and
   (d) substantially degrading said supply of said treated sludge in said aerobic treatment system,
wherein said aerobic treatment system receives said supply of said wastewater and said supply of said treated sludge, wherein said degrading of said treated sludge limits the rate of accumulation of sludge-derived solids in said aerobic treatment system during operation of said process, and wherein said sludge comprises aerobic sludge produced by said aerobic treatment system and wherein the net mass of solids present in said treated sludge degraded in said aerobic treatment system approximates the net mass of solids present in said aerobic sludge produced by said aerobic treatment system, thereby substantially avoiding net accumulation of solids in said aerobic treatment system during operation of said process.

2. The process as defined in claim 1, wherein said aerobic treatment system continuously or semi-continuously receives said supply of said wastewater and said supply of said treated sludge.

3. The process as defined in claim 2, wherein the hydraulic residence time of said supply of treated sludge in said aerobic treatment system is less than 36 hours.

4. The process as defined in claim 3, wherein the hydraulic residence time of said supply of treated sludge in said aerobic treatment system is less than 24 hours.

5. The process as defined in claim 4, wherein the hydraulic residence time of said supply of treated sludge in said aerobic treatment system is less than 12 hours.

6. The process as defined in claim 5, wherein the hydraulic residence time of said supply of treated sludge in said aerobic treatment system is less than 8 hours.

7. The process as defined in claim 1, wherein said sludge comprises primary sludge removed from said wastewater.

8. The process as defined in claim 1, wherein said supply of said sludge is treated in a sludge treatment unit in fluid communication with said aerobic treatment system.

9. The process as defined in claim 8, wherein said treated sludge is continuously or semi-continuously conveyed to said aerobic treatment system from said sludge treatment unit during operation of said process.

10. The process as defined in claim 1, further comprising anaerobically treating said supply of said treated sludge prior to said conveying to said aerobic treatment system.

11. The process as defined in claim 8, wherein said sludge is selected from the group consisting of said aerobic sludge and primary sludge produced by treatment of said wastewater.

12. The process as defined in claim 11, wherein said aerobic sludge comprises return activated sludge (RAS) and waste activated sludge (WAS), and wherein a substantial proportion of said WAS and optionally some RAS is treated in said sludge treatment unit and is conveyed to said aerobic treatment system as said treated sludge.

13. The process as defined in claim 12, wherein substantially all of said WAS is treated in said sludge treatment unit and is conveyed to said aerobic treatment system as said treated sludge, thereby substantially avoiding the need for dewatering or disposal of said WAS.

14. The process as defined in claim 8, wherein said aerobic treatment system comprises an aerobic treatment apparatus and a liquid/solid separation apparatus, and wherein said sludge treatment unit is in fluid communication with said separation apparatus for continuously receiving said aerobic sludge therefrom.

15. The process as defined in claim 10, wherein said treated sludge is conveyed directly to said aerobic treatment system following anaerobic treatment.

16. The process as defined in claim 8, wherein said supply of said treated sludge is conveyed to said aerobic treatment system without dewatering or solids removal downstream of said sludge treatment unit.

17. The process as defined in claim 8, wherein a substantial proportion of microbial cells present in said sludge is lyzed in said sludge treatment unit.

18. The process as defined in claim 17, wherein said sludge is substantially liquefied in said sludge treatment unit.

19. The process as defined in claim 18, wherein said sludge is passed through a high pressure nozzle in said sludge treatment unit to substantially lyze cells present in said sludge.

20. The process as defined in claim 8, comprising providing an anaerobic digester in fluid communication with said aerobic treatment system and said sludge treatment unit, wherein material present in said sludge is circulated through said sludge treatment unit, said anaerobic digester and said aerobic treatment apparatus multiple times.

21. The process as defined in claim 1, comprising thickening said sludge prior to said treating a supply of said sludge.

22. The process as defined in claim 1, comprising removing non-digestible particulate material from said sludge prior to said treating a supply of said sludge.

23. The process as defined in claim 14, wherein said aerobic treatment apparatus is selected from the group consisting of an activated sludge reactor, a UNOX sludge treatment system, a trickling filter, an aeration basin, an oxidation ditch, a rotating biological contactor, a sequencing batch reactor, a membrane bioreactor and a suspended media system and wherein said liquid/solid separation apparatus is selected from the group consisting of a clarifier, a membrane and a filter.

24. The process as defined in claim 7, comprising removing said primary sludge from said wastewater in a liquid/solid separation apparatus located upstream of said aerobic treatment system.

25. The process as defined in claim 24, comprising removing non-digestible particulate material from said primary sludge.

26. The process as defined in claim 24, comprising thickening said primary sludge.

27. The process as defined in claim 11, wherein treating said supply of said sludge comprises treating a first supply of said primary sludge and treating a second supply of said aerobic sludge, wherein said supply of said treated sludge conveyed to said aerobic treatment system is derived from said first and said second supply.

28. The process as defined in claim 1, comprising removing compounds from said treated sludge prior to conveying said supply of said treated sludge to said aerobic treatment system.

29. The process as defined in claim 28, wherein said compounds are selected from the group consisting of nutrients and heavy metals.

30. The process as defined in claim 1, wherein said treating said supply of said sludge comprises subjecting said sludge to treatment selected from the group consisting of elevated pressure, elevated temperature, addition of chemicals, addition of biochemicals, electroporation, microwave, cavitation, ultrasound or shear forces.

31. The process as defined in claim 1, wherein substantially all of said supply of treated sludge conveyed to said aerobic treatment system is degraded in said aerobic treatment system without significantly decreasing the specific oxygen uptake rate (SOUR) of microorganisms present therein.

32. The process as defined in claim 8, wherein said aerobic treatment system produces said aerobic sludge and treated effluent and wherein said process comprises adjusting the flow of aerobic sludge from said aerobic treatment system to said sludge treatment unit to provide a nutrient supply in said treated sludge for microorganisms present in said aerobic treatment system while maintaining the total suspended solids (TSS) concentration of said treated effluent below a threshold amount.

33. The process as defined in claim 14, comprising adjusting said flow of said aerobic sludge conveyed from said aerobic treatment system to said sludge treatment unit to provide a nutrient supply in said treated sludge for microorganisms present in said aerobic treatment system while maintaining the sludge volume index (SVI) of said liquid/solid separation apparatus below a threshold amount.

34. The process as defined in claim 14, wherein the hydraulic residence time of said supply of said treated sludge in said aerobic treatment apparatus is less than 12 hours.

35. A wastewater treatment system for treating wastewater derived from an effluent supply comprising:
   (a) an aerobic treatment system for receiving wastewater from said effluent supply, wherein said aerobic treatment system produces treated effluent and aerobic sludge;
   (b) a sludge treatment unit in fluid communication with said aerobic treatment system, wherein said sludge treatment unit ruptures microbial cells present in said supply of said sludge thereby producing treated sludge having an increased liquid:solid ratio and an increased degradation potential in comparison to untreated sludge; and
   (c) a sludge flowpath for conveying said treated sludge from said sludge treatment unit to said aerobic treatment system,
wherein said aerobic treatment system comprises an aerobic treatment apparatus and a liquid/solid separation apparatus and wherein said aerobic treatment apparatus is selected from the group consisting of an activated sludge reactor, a UNOX sludge treatment system, a trickling filter, an aeration basin, an oxidation ditch, a rotating biological contactor, a sequencing batch reactor, a membrane bioreactor and a suspended media system and wherein said liquid/solid separation apparatus is selected from the group consisting of a clarifier, a membrane and a filter.

36. A wastewater treatment system for treating wastewater derived from an effluent supply comprising:
   (a) an aerobic treatment system for receiving wastewater from said effluent supply, wherein said aerobic treatment system produces treated effluent and aerobic sludge;
   (b) a sludge treatment unit in fluid communication with said aerobic treatment system, wherein said sludge treatment unit ruptures microbial cells present in said supply of said sludge thereby producing treated sludge having an increased liquid:solid ratio and an increased degradation potential in comparison to untreated sludge; and
   (c) a sludge flowpath for conveying said treated sludge from said sludge treatment unit to said aerobic treatment system,
said system comprising an anaerobic digester located downstream from said sludge treatment unit for anaerobically digesting said treated sludge prior to conveying said treated sludge to said aerobic treatment system.

37. The system as defined in claim 36, wherein an outlet of said anaerobic digester is connected directly to an inlet of said aerobic treatment system, wherein said treated sludge is not subjected to dewatering or solids removal in said sludge flowpath between said anaerobic digester and said aerobic treatment system.

38. The system as defined in claim 35, comprising a primary liquid/solid separation apparatus for removing primary sludge from said wastewater prior to delivery of said wastewater to said aerobic treatment system.

39. The system as defined in claim 35, comprising a first debris removal apparatus for removing at least some non-digestible particulate materials from said wastewater prior to delivery of said wastewater to said aerobic treatment system.

40. The system as defined in claim 39, comprising a second debris removal apparatus for removing non-digestible particulate materials present in said sludge prior to delivery of said sludge to said sludge treatment unit.

41. The system as defined in claim 35, comprising a thickener for thickening said sludge upstream of said sludge treatment unit.

42. The system as defined in claim 38, comprising:
   (a) a primary sludge treatment unit for receiving at least some of said primary sludge from said primary liquid/solid separation apparatus and rupturing microbial cells present in said at least some of said primary sludge, thereby producing treated primary sludge having an increased liquid:solid ratio and an increased degradation potential in comparison to untreated primary sludge; and
   (b) a primary sludge flowpath for delivering said treated primary sludge from said primary sludge treatment unit to said aerobic treatment system.

43. The system as defined in claim 42, comprising an anaerobic digester for anaerobically treating said treated primary sludge prior to delivery of said treated primary sludge to said aerobic treatment system.

44. The system as defined in claim 35, wherein said sludge treatment unit comprises a high pressure nozzle for substantially liquefying said sludge.

45. The system as defined in claim 42, wherein said primary sludge treatment unit comprises a high pressure nozzle for substantially liquefying said at least some of said primary sludge.

46. The system as defined in claim 42, comprising a thickener for thickening said primary sludge upstream of said primary sludge treatment unit.

47. The system as defined in claim 35, comprising a compound recovery device for recovering compounds from said treated sludge prior to conveying said treated sludge to said aerobic treatment system.

48. The system as defined in claim 35, comprising an adjustable control for varying the volume of said supply of said sludge delivered from said aerobic treatment system to said sludge treatment unit in response to a measured parameter selected from the group consisting of the total suspended solids (TSS) concentration of said treated effluent and the sludge volume index (SVI) of said liquid/solid separation apparatus.

49. The system as defined in claim 42, wherein said sludge treatment unit comprises said primary sludge treatment unit, and wherein said primary sludge is mixed with said supply of aerobic sludge.

50. A process for treating wastewater received from an effluent supply comprising:
   (a) aerobically treating said wastewater in an aerobic treatment system to produce treated effluent and aerobic sludge;
   (b) conveying a supply of said sludge from said aerobic treatment system to a sludge treatment unit;
   (c) rupturing microbial cells present in said supply of said sludge in said sludge treatment unit to produce treated sludge having an increased liquid:solid ratio and an increased degradation potential in comparison to untreated sludge;

(d) conveying a supply of said treated sludge to said aerobic treatment system; and (e) substantially degrading solids present in said supply of treated sludge in said aerobic treatment system, wherein the net mass of solids present in said supply of treated sludge degraded in said aerobic treatment system approximates the net mass of solids produced by said aerobic treatment system present in said aerobic sludge, thereby substantially avoiding net accumulation of solids in said aerobic treatment system during operation of said process.

51. The process as defined in claim 50, wherein said aerobic sludge comprises waste activated sludge (WAS) and wherein at least a substantial fraction of said WAS produced by said aerobic treatment system is conveyed to said sludge treatment unit and is thereafter conveyed to said aerobic treatment system as treated sludge.

52. The process as defined in claim 51, wherein substantially all of said WAS produced by said aerobic treatment system is conveyed to said sludge treatment unit and is thereafter conveyed to said aerobic treatment system as said treated sludge.

53. The process as defined in claim 50, wherein said process operates continuously or semi-continuously, wherein the hydraulic residence time of said treated sludge in said aerobic treatment system is less than 12 hours.

54. The process as defined in claim 50, wherein all of said supply of treated sludge is degraded in said aerobic treatment system.

55. A process for treating wastewater received from an effluent supply comprising:

(a) aerobically treating said wastewater in an aerobic treatment system to produce treated effluent and sludge;

(b) treating a supply of said sludge by rupturing microbial cells present therein to produce treated sludge having an increased liquid:solid ratio and an increased degradation potential in comparison to untreated sludge; and (c) degrading said treated sludge in said aerobic treatment system, wherein at least a substantial fraction of the total volume of said sludge produced by said aerobic treatment system is converted to said treated sludge, and wherein said treated sludge is thereafter substantially degraded in said aerobic treatment system.

56. The process as defined in claim 55, wherein a substantial proportion of said microbial cells present in said supply of said sludge is ruptured prior to degradation of said treated sludge in said aerobic treatment unit.

57. The process as defined in claim 56, wherein substantially all of said treated sludge is degraded in said aerobic treatment system, whereby said process is continuously operable without substantial accumulation of solids in said aerobic treatment system.

58. The process as defined in claim 55, wherein said aerobic treatment system comprises a liquid/solid separation apparatus, wherein said process is operable while maintaining the total suspended solids (TSS) concentration of said treated effluent and the sludge volume index (SVI) of said separation apparatus below predetermined thresholds amounts.

59. A process for treating wastewater received from an effluent supply comprising:

(a) aerobically treating said wastewater in an aerobic treatment system to produce treated effluent and aerobic sludge;

(b) treating a supply of said aerobic sludge from said aerobic treatment system in a sludge treatment unit to rupture microbial cells present in said supply of said aerobic sludge, thereby producing treated sludge having an increased liquid:solid ratio and an increased degradation potential in comparison to untreated sludge;

(c) conveying said treated sludge to said aerobic treatment system wherein at least a substantial fraction of waste activated sludge (WAS) is conveyed to said aerobic treatment system as said treated sludge; and (d) degrading substantially all of said treated sludge in said aerobic treatment system.

60. The process as defined in claim 59, comprising anaerobically treating said treated sludge prior to conveying said treated sludge to said aerobic treatment system.

61. The process as defined in claim 59, comprising anaerobically treating said aerobic sludge prior to treating said aerobic sludge in said sludge treatment unit.

62. A process for degrading sludge produced by treatment of wastewater comprising:

(a) providing an aerobic treatment system receiving a supply of said wastewater;

(b) treating a supply of said sludge by rupturing microbial cells present therein to produce treated sludge having an increased liquid:solid ratio and an increased degradation potential in comparison to untreated sludge;

(c) conveying a supply of said treated sludge to said aerobic treatment system; and (d) substantially degrading said supply of said treated sludge in said aerobic treatment system, wherein substantially all of said supply of treated sludge conveyed to said aerobic treatment system is degraded in said aerobic treatment system without significantly decreasing the specific oxygen uptake rate (SOUR) of microorganisms present therein.

63. A process for degrading sludge produced by treatment of wastewater comprising:

(a) providing an aerobic treatment system receiving a supply of said wastewater;

(b) treating a supply of said sludge by rupturing microbial cells present therein to produce treated sludge having an increased liquid:solid ratio and an increased degradation potential in comparison to untreated sludge;

(c) conveying a supply of said treated sludge to said aerobic treatment system; and (d) substantially degrading said supply of said treated sludge in said aerobic treatment system, wherein said sludge comprises aerobic sludge produced by said aerobic treatment system and wherein the net mass of solids present in said treated sludge degraded in said aerobic treatment system approximates the net mass of solids present in said aerobic sludge produced by said aerobic treatment system, thereby substantially avoiding net accumulation of solids in said aerobic treatment system during operation of said process.

* * * * *